US011361181B2

(12) United States Patent
Hoggatt et al.

(10) Patent No.: US 11,361,181 B2
(45) Date of Patent: Jun. 14, 2022

(54) CONTROLLING ACCESS TO BARCODE-READING FUNCTIONALITY

(71) Applicant: The Code Corporation, Murray, UT (US)

(72) Inventors: Denver Joseph Hoggatt, Draper, UT (US); Steve Pierce, West Jordan, UT (US)

(73) Assignee: The Code Corporation, Murray, UT (US)

( * ) Notice: Subject to any disclaimer, the term of this patent is extended or adjusted under 35 U.S.C. 154(b) by 0 days.

(21) Appl. No.: 16/861,160

(22) Filed: Apr. 28, 2020

(65) Prior Publication Data
US 2021/0334489 A1    Oct. 28, 2021

(51) Int. Cl.
*G06K 7/10* (2006.01)
*G06K 7/14* (2006.01)

(52) U.S. Cl.
CPC ....... *G06K 7/1413* (2013.01); *G06K 7/10207* (2013.01); *G06K 7/10227* (2013.01); *G06K 7/1417* (2013.01)

(58) Field of Classification Search
CPC ............. G06K 7/1413; G06K 7/10207; G06K 7/10227; G06K 7/1417
USPC .............. 235/462.01, 462.1, 462.13, 462.15, 235/462.45, 462.46, 472.01, 472.02
See application file for complete search history.

(56) References Cited

U.S. PATENT DOCUMENTS

| | | | | |
|---|---|---|---|---|
| 5,825,002 A * | 10/1998 | Roslak | ................... | G06K 17/00 |
| | | | | 235/375 |
| 6,853,197 B1 * | 2/2005 | McFarland | ............ | H01Q 1/242 |
| | | | | 324/549 |
| 9,182,244 B2 * | 11/2015 | Luke | .......................... | B60L 3/12 |
| 9,355,291 B1 * | 5/2016 | Pierce | ................ | G06K 7/10821 |
| 2007/0168163 A1 * | 7/2007 | Kobayashi | ........... | G05B 19/042 |
| | | | | 702/188 |
| 2011/0241824 A1 * | 10/2011 | Uesugi | .................. | B60L 53/305 |
| | | | | 340/5.8 |
| 2012/0232367 A1 * | 9/2012 | Allegri | ................ | H04L 63/0428 |
| | | | | 600/365 |
| 2013/0007848 A1 * | 1/2013 | Chaskar | ................ | H04W 12/08 |
| | | | | 726/4 |
| 2014/0075516 A1 * | 3/2014 | Chermside | ............ | H04L 63/061 |
| | | | | 726/4 |

(Continued)

*Primary Examiner* — Thien M Le
(74) *Attorney, Agent, or Firm* — Thomas M. Hardman

(57) ABSTRACT

The disclosure concerns systems and methods for controlling access to a device with barcode-reading functionality. Enabling the barcode-reading functionality of the device may require providing authenticating information. A user may provide the authenticating information using an identification card with an embedded near field communication (NFC) tag. After the device or a charger of the device validates the embedded NFC tag, the device may enable the barcode-reading functionality but track an amount of time since a last barcode scan of the device. If the amount of time since the last barcode scan reaches a present period, the device may disable the barcode-reading functionality. The device may send a connection request from a portion of a local area network (LAN). A server may receive the request. The server may deny the device access to the LAN if the device is not authorized for use in the portion of the LAN.

20 Claims, 22 Drawing Sheets

(56) References Cited

U.S. PATENT DOCUMENTS

2017/0372289 A1* 12/2017 Fitzsimmons .......... H04L 67/02
2018/0293566 A1* 10/2018 Engles ................... G06Q 50/30

* cited by examiner

| Timestamp | Station ID | User ID | Item ID |
|---|---|---|---|
| 9:47:12 | S1 | User1 | Item1 |
| 9:49:32 | S1 | User1 | Item2 |
| 9:53:07 | S1 | User1 | Item3 |
| 9:54:58 | S1 | User1 | Item4 |
| 10:01:47 | S5 | User5 | Item1 |
| 10:03:34 | S1 | User1 | Item5 |
| 10:05:16 | S5 | User5 | Item2 |
| 10:08:01 | S1 | User1 | Item6 |
| 10:09:23 | S7 | User7 | |
| 10:12:07 | S5 | User5 | Item3 |
| 10:17:56 | S1 | User1 | Item7 |
| 10:20:21 | S8 | User8 | Item1 |
| 10:22:17 | S7 | User7 | |
| 10:25:36 | S5 | User12 | Item4 |
| 10:27:14 | S1 | User1 | Item8 |
| 10:30:12 | S8 | User8 | Item2 |
| 10:35:49 | S7 | User7 | |
| 10:37:08 | S5 | User12 | Item5 |
| 10:40:12 | S1 | User1 | Item9 |
| 10:42:47 | S10 | User10 | Item1 |
| 10:45:32 | S8 | User8 | Item3 |
| 10:47:13 | S7 | User7 | |
| 10:51:19 | S5 | User12 | Item6 |
| 10:53:02 | S1 | User1 | Item10 |
| 10:55:14 | S11 | User11 | Item1 |
| 10:58:57 | S10 | User10 | Item2 |
| 11:01:32 | S8 | User8 | Item4 |
| 11:03:59 | S7 | User7 | |
| 11:06:01 | S5 | User12 | Item7 |
| 11:09:17 | S1 | User1 | Item11 |

FIG. 7

CONTROLLING ACCESS TO BARCODE-READING FUNCTIONALITY

BACKGROUND

A barcode is an optical machine-readable representation of information. Devices for identifying or extracting information from barcodes are generally referred to as barcode readers (or barcode scanners).

There are several different types of barcode readers that are commonly used today. For example, one type of barcode reader that is in widespread use is an image-based barcode reader, which includes a camera for capturing an image of a barcode to be read. The camera includes a focusing lens that focuses light reflected from a target area onto a photo sensor array. Once an image of a barcode has been captured by the camera, a decoder processes the image and extracts the information contained in the barcode. An image-based barcode reader may be a standalone device, or it may be a mobile computing device (e.g., a smartphone or tablet computer) that includes a camera and software for reading barcodes. Some other examples of barcode readers include pen-type scanners, laser scanners, charge-coupled device (CCD) readers, etc.

Barcodes and barcode readers have become widely used in many different types of commercial environments. In addition to being commonly used in point-of-sale stations in retail stores and supermarkets, barcodes and barcode readers are frequently used for many other purposes as well. For example, hospitals may use barcode readers in connection with providing medical services.

SUMMARY

In accordance with one aspect of the present disclosure, a barcode-reading system is disclosed that includes a device having barcode-reading capability. The device includes a wireless communication system for transmitting barcode-reading data, an inactivity module that tracks an amount of time since a last barcode scan, and a control module that disables transmission of the barcode-reading data when the amount of time since the last barcode scan reaches a preset period and that enables transmission of the barcode-reading data in response to receiving authentication information. The barcode-reading system also includes a charger configured to couple to the device and provide power to the device. The charger includes an authentication system that determines whether a user is authorized to use the device and a communication system that transmits the authentication information to the device when the authentication system determines that the user is authorized to use the device.

The authentication system may include a near field communication (NFC) reader.

The authentication system may determine whether the user is authorized to use the device by authenticating an NFC embedded identification card of the user.

The wireless communication system may include one or more of a local area network (LAN) communications module and a wireless point-to-point module.

The authentication information may identify the user.

The charger may be a docking station.

In accordance with another aspect of the present disclosure, a barcode-reading system includes a device that includes a barcode reader, an inactivity module that tracks an amount of time since a last barcode read, and a control module that disables the barcode reader when the amount of time since the last barcode read reaches a preset period and that enables the barcode reader upon receipt of authentication information. The barcode-reading system also includes a charger configured to couple to the device and provide power to the device. The charger includes an authentication system that determines whether a user is authorized to use the device and a communication system that transmits the authentication information to the device when the authentication system determines that the user is authorized to use the device.

The authentication system may include an NFC reader.

The authentication system may determine whether the user is authorized to use the device by authenticating an NFC embedded identification card of the user.

The device may include a wireless communication system for transmitting barcode-reading data and the wireless communication system may include one or more of a local area network (LAN) communications module and a wireless point-to-point module.

The authentication information may identify the user.

The charger may be a docking station.

In accordance with another aspect of the present disclosure, a system is disclosed that includes one or more processors and memory. The memory includes instructions that are executable by the one or more processors to cause the system to receive a connection request for a device with barcode-reading capability. The connection request identifies the device. The memory also includes instructions that are executable by the one or more processors to cause the system to receive location information for the device. The location information indicates a portion of a local area network (LAN) from which the connection request was sent. The memory also includes instructions that are executable by the one or more processors to cause the system to determine whether the device is authorized for use in the portion of the LAN. The memory also includes instructions that are executable by the one or more processors to cause the system to provide a response to the connection request based on the determination of whether the device is authorized for use in the portion of the LAN.

Determining whether the device is authorized for use in the portion of the LAN may include determining whether a list of approved devices for the portion of the LAN identifies the device.

The device may not be authorized for use in the portion of the LAN when the list of approved devices for the portion of the LAN does not identify the device.

The device may be authorized for use in the portion of the LAN when the list of approved devices for the portion of the LAN identifies the device.

The response to the connection request may grant the device access to the LAN when the device is authorized for use in the portion of the LAN.

The instructions that are executable by the one or more processors may further cause the system to determine that the device is authorized for use in the portion of the LAN, grant the device access to the portion of the LAN, and receive decoded data from the device. The decoded data may correspond to a barcode read by the device.

The response to the connection request may deny the device connection to the LAN when the device is not authorized for use in the portion of the LAN.

In accordance with another aspect of the present disclosure, a device with barcode-reading capabilities is disclosed. The device includes a wireless communication system, one or more processors, and memory. The memory includes instructions that are executable by the one or more processors to cause the device to send, through the wireless communication system, a request to connect to a local area network (LAN). The request identifies the device. The request is sent from a location in the LAN. The method also includes instructions that are executable by the one or more processors to cause the device to receive a response to the request. The response indicates whether the device is authorized to connect to the LAN at the location and wherein device is denied access to the LAN if the device is not authorized to connect to the LAN at the location and is granted access to the LAN if the device is authorized to connect to the LAN at the location.

The location may be in a first portion of the LAN and the device may be authorized to connect to the LAN at the location when the device is authorized for use in the first portion of the LAN.

The device may be authorized for use in the first portion of the LAN when a list of approved devices for the first portion of the LAN identifies the device.

The device may not be authorized for use in the first portion of the LAN when the list of approved devices for the first portion of the LAN does not identify the device.

The list may be stored on a server connected to the LAN.

The response to the request may indicate that the device is authorized to connect to the LAN at the location and the instructions that are executable by the one or more processors may further cause the device to capture an image of a barcode, decode the image of the barcode, and send decoded data to a server through the LAN.

The response to the request may indicate that the device is not authorized to connect to the LAN at the location and the instructions that are executable by the one or more processors may further cause the device to indicate a connection error to a user of the device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which:

FIG. 7 illustrates an example of auxiliary data that may be collected by devices in connection with the assembly of various items.

DETAILED DESCRIPTION

Figure 1:
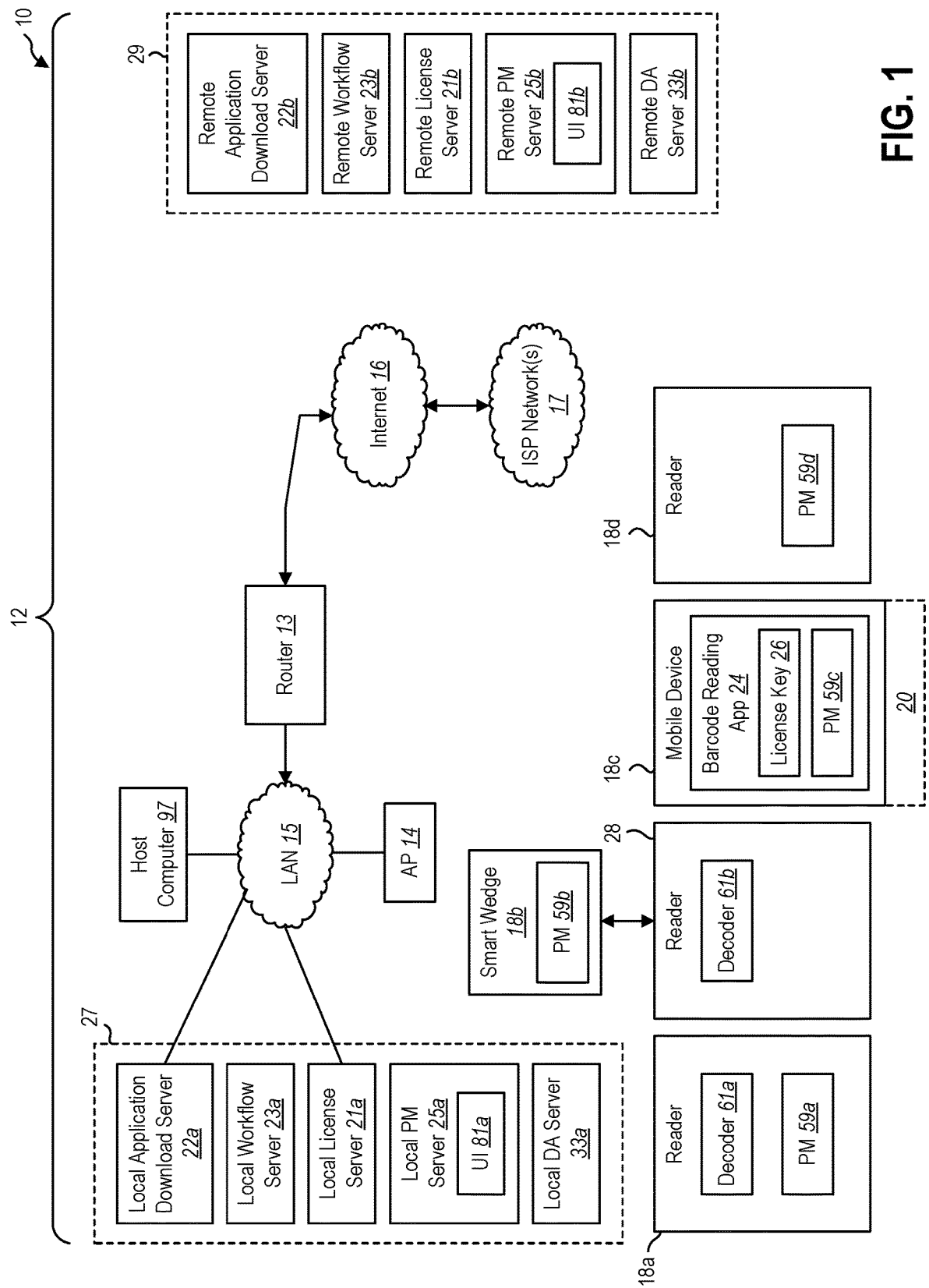
FIG. 1 illustrates the environment of a system according to one embodiment of the present disclosure.

FIG. 1 depicts the environment of a system 10 according to one embodiment of the present application wherein process management input devices 18a-18d, at least some of which may include barcode reading functionality, provide both barcode encoded data to applicable workflow servers 23a-23b (traditional use of data encoded within and read from barcodes by barcode readers); and ii) in conjunction with reading barcode data to support the workflow servers 23a-23b, generate auxiliary data during the process of reading the barcodes for auxiliary process management systems 25a-25b and/or aggregation systems 33a-33b.

The system 10 may include one or more workflow servers 23, including a local workflow server 23a and a remote workflow server 23b. In general, the workflow servers 23a-23b use the data encoded within the barcode to track, manage, document a workflow process.

In one embodiment, the workflow servers 23a-23b may support a retail sales workflow wherein a barcode reader attached to a POS system may be used to identify articles being purchased (e.g. read a UPC barcode). The data within the barcode is used to identify the product and the workflow server, upon receiving the product ID may look up the product price for the POS system to complete the sale. The workflow servers may be used to track inventory of the products, automate ordering of new products, etc.

In one embodiment, the workflow servers 23a-23b may be part of a hospital or other healthcare provider's electronic health record system. Data within barcode on equipment, consumables, medications, and patient wristbands may be used to record medical operations such as disbursement of medications and use of equipment and/or consumables within the electronic health record systems.

In one embodiment, the workflow servers 23a-23b may be part of a manufacturer's assembly line. Data within barcodes on components may be read and used to identify components (by part number common across all components or by serial number identifying each component individually), track inventory, associate components with final assemblies etc.

In one embodiment, the workflow servers 23a-23b may be part of a provider's systems for verifying age of purchasers of age restricted items such as alcohol or tobacco products. A barcode on an individual's ID card may be read for verification of the individual's age and the workflow servers 23a-23b may retain certain identification information for the duration of time proscribed by applicable law.

The process management servers 25a-25b may use: i) certain portions of the data encoded in, and read from, the barcodes; and/or ii) auxiliary data generated during the process of reading the barcodes to evaluate and improve efficiency of the workflow.

The data aggregation servers 33a-33b may use: i) certain portions of the data encoded in, and read from, the barcodes; and/or ii) auxiliary data generated during the process of reading the barcodes to aggregate non-personally identifiable statistical data regarding the workflow or multiple workflows.

In one embodiment, the process management servers 23a-23b and/or data aggregation servers 25a-25b may obtain information about the quality of each barcode being read (print quality). As such as quality information may be aggregated and statistics calculated, it may become apparent that certain products may have better printed barcodes than other products or that quality of printing is deteriorating over time on a certain barcode.

In a related embodiment, the process management servers and/or data aggregation servers may obtain information about the quality each barcode being read by multiple barcode readers. As such quality information is being aggregated and statistics calculated, it may become apparent that certain barcodes appear to be of better quality in one reader over another reader so that it can be concluded that one reader is capturing clearer images. The reader that is capturing the less clear images may be checked for damage such as a scratched or dirty imaging window.

In one embodiment, the process management servers may track the location of each replaceable battery back used on barcode readers or other data capture devices as part of the workflow. The age and diminished health (diminished charge capacity) may be tracked.

In one embodiment, the process management servers and/or data aggregation servers may track metadata associated with each barcode read and the data analyzed and used for measuring efficiency of the workflow and/or equipment or individuals participating in the workflow. Metadata may include location of the barcode read, the user of the barcode reader, a timestamp of the barcode read etc.

The system 10 includes a network 12 via with barcode data and the auxiliary data are provided from the process management input devices 18a-18d to the applicable workflow servers 23a-23b, process management servers 25a-25b, and data aggregation servers 33a-33b.

The network 12 may be expansive including one or more local area networks (LAN) 15, the internet 16, and one or more wired or wireless internet service provider networks 17.

Each local area network 15 may use any known network technologies such as Ethernet and TCP/IP protocols to interconnect various systems. Each LAN 15 may further include at least one wireless access point 14 enabling wireless LAN communications with various systems utilizing known technologies such as Wi-Fi™ (IEEE 802.11).

The LAN 15 may be coupled to the Internet 16 via a router 13. Although FIG. 1 depicts the LAN 15 coupled to the Internet 16 via a single router 13, such connections may employ multiple routers and firewall systems, including demilitarized zone (DMZ) networks.

For purposes of illustration, the systems interconnected by the LAN 15 may include the local workflow server 23a, local process management server 25a, a local data aggregation server 33a and various process management input devices 18a-18d.

Coupling the LAN 15 to the internet 16 enables the system 10 to include and interconnect remote workflow server(s) 23b, remote process management server(s) 25b, remote data aggregation server(s) 33b, and various other process management input devices 18a-18d via one or more wired or wireless internet service provider networks 17.

The remote devices (e.g., devices coupled to the Internet 16) may be logically connected to the LAN 15 using Virtual Private Network (VPN) technology. As such, a mobile device, 18d for example, coupled to communicate with the wireless ISP network 17 utilizing WAN communications may, utilizing a VPN technology, be an endpoint on the LAN 15.

The process management input devices 18a-18d may include combinations of smart barcode readers 18a, smart wedges 18b, mobile devices 18c, and non-barcode reading process data input devices 18d. Each of the process management input devices 18a-18d may be configured to perform one or more process management operations. The process management operations may include determining auxiliary data corresponding to a workflow process. The auxiliary data may include metadata that is generated in connection with reading one or more barcodes during the workflow process. The process management operations may also include sending the auxiliary data to one or more servers, such as the process management servers 25a-25b and/or the data aggregation servers 33a-33b. To enable the process management input devices 18a-18d to perform process management operations, each of the process management input devices 18a-18d may include code (which may be referred to herein as process management code) that is stored in memory and executable by one or more processors to perform process management operations.

In general, a smart barcode reader 18a may be configured to perform process management operations in addition to having barcode reading capability. In other words, in addition to reading barcodes and outputting decoded data for the workflow servers 23a-23b, a smart barcode reader 18a may also be configured to generate auxiliary data for use by the process management servers 25a-25b and/or data aggregation servers 33a-33b. In addition to a decoder 61a, the smart barcode reader 18a is also shown with process management code 59a that enables the smart barcode reader 18a to perform process management operations.

In general, a smart wedge device 18b is configured to be connected to a traditional barcode reader 28 that is not capable of performing process management operations. The smart wedge device 18b may be configured to perform one or more process management operations related to the barcode reading operations that are performed by the barcode reader 28. For example, a smart wedge device 18b may be configured to: i) couple to, and receive decoded barcode data from, a traditional barcode reader 28; ii) forward the decoded data to the applicable workflow server 23; iii) generate auxiliary data in relation to the forwarded decoded data; and iv) provide a combination of portions of the decoded data and/or the auxiliary data to one or more of the process management servers 25a-25b and/or data aggregation servers 33a-33b. In FIG. 1, the traditional barcode reader 28 is shown with a decoder 61b, and the smart wedge device 18b is shown with process management code 59b.

The term "mobile device," as the term is used in this patent specification and the accompanying claims, will be used to describe a portable, hand-held computing device that comprises a camera. One example of a mobile device is a smartphone. Another example of a mobile device is a tablet computer. Yet another example is a hybrid tablet/smartphone device, often nicknamed a "phablet."

A mobile device 18c may include a barcode reading application 24 that enables the mobile device 18c to perform barcode reading operations. For example, the barcode reading application 24 may utilize a camera of the mobile device 18c to capture an image of a barcode. The barcode reading application 24 may also include a decoder that processes the captured image in order to decode the barcode. In addition to performing barcode reading operations, the barcode reading application 24 may also be configured to perform one or more process management operations. FIG. 1 shows the barcode reading application 24 with process management code 59c for providing this functionality. In operation, the barcode reading application 24 may utilize a camera of the mobile device 18c to read barcodes; ii) provide the decoded data to the applicable workflow server 23; iii) generate auxiliary data in relation to the barcode read and/or in relation to the decoded data; and iv) provide a combination of portions of the decoded data and/or the auxiliary data to one or more of the process management servers 25a-b and/or data aggregation servers 33a-33b. The auxiliary data generated by a non-barcode reading process management input device 18d may: i) relate to the workflow in which other process management input devices 18a-18c provide decoded barcode data as part of the workflow; and/or ii) relate to the barcode data read by the other process management input devices 18a-18c as part of the workflow.

In general, a non-barcode reading process management input device 18d does not have barcode reading capability but is capable of performing process management operations. For example, the non-barcode reading process management input device 18d may be configured to generate auxiliary data in relation to the workflow and provide the auxiliary data to one or more of the process management servers 25a-25b and/or data aggregation servers 33a-33b.

The system 10 may include a host computer 97. The host computer 97 may be a computing device. For example, the host computer 97 may be a desktop computer or a laptop computer. The host computer 97 may include a communication system. The communication system may allow the host computer 97 to communicate with other devices. The communication system may allow the host computer 97 to communicate with other devices or the LAN 15 wirelessly or through a wired connection. The communication system may include a point-to-point communication module, such as a Bluetooth modem. The point-to-point communication module may include any of the features or functionalities of point-to-point interface 108b or wireless point-to-point communication interface 58.

The host computer 97 may communicate with the process management input devices 18a-d using the point-to-point communication module. The process management input devices 18a-d may access the LAN 15 and the local workflow server 23a through the host computer 97. For example, the process management input devices 18a-d may send data to the host computer 97 using point-to-point communication (such as Bluetooth®) and the host computer 97 may send the data to a server (such as the local workflow server 23a) through the LAN 15. The host computer 97 may access the LAN 15 through a wired connection or a wireless connection.

Figure 2:
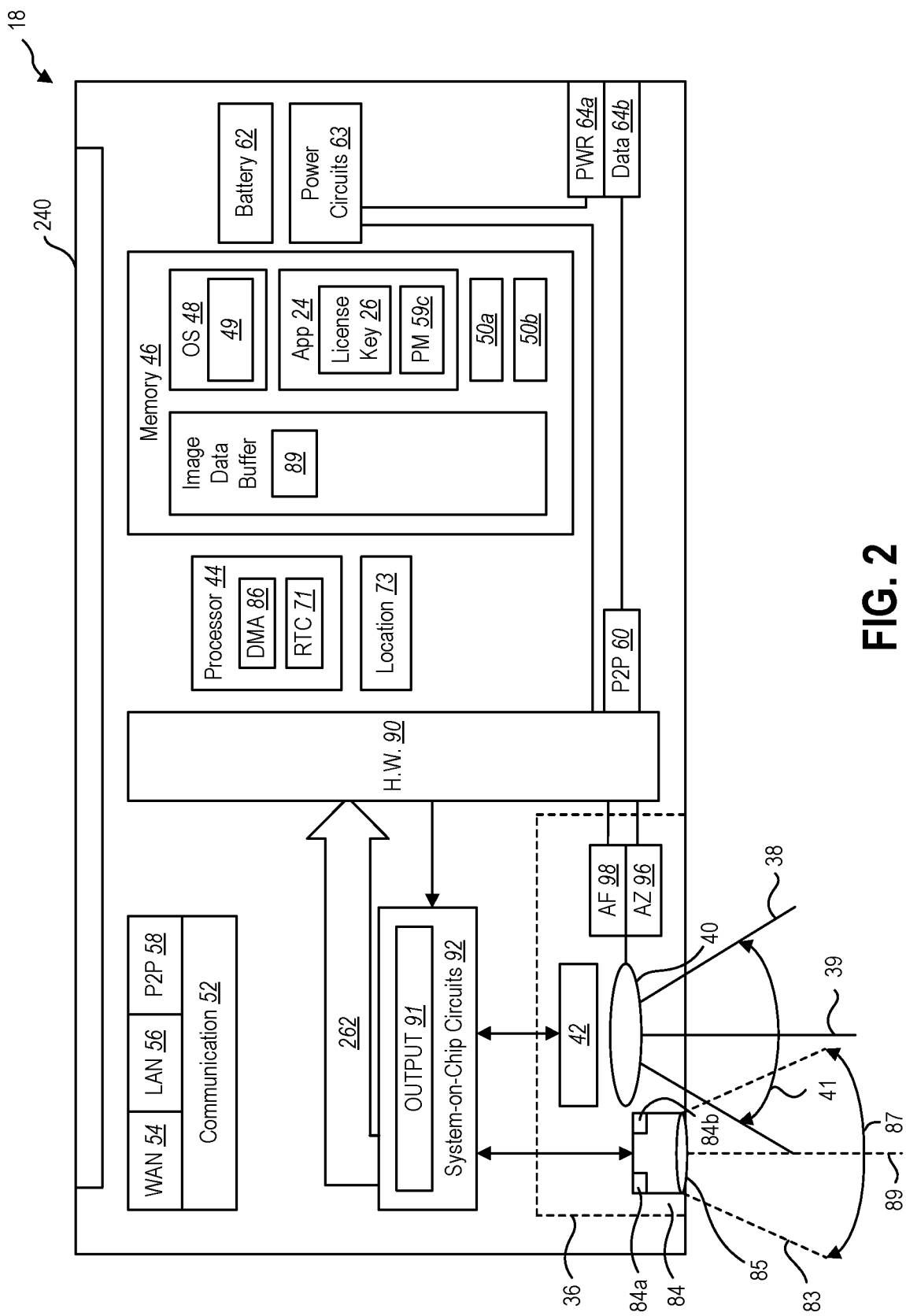
FIG. 2 illustrates an embodiment of a mobile device that may be used in the system shown in FIG. 1.

Referring to FIG. 2 in conjunction with FIG. 1, each mobile device 18c may include a wireless communication system 52 for operating within a wireless network environment. The wireless communication system 52 may comprise any permutation of: i) a local area network (LAN) communications module 56, ii) a wide area network (WAN) communications module 54, and/or iii) a wireless point-to-point communication interface 58.

The LAN communications module 56 may utilize Wi-Fi™ (IEEE 802.11) or similar wireless local area communication protocols for communication with a wireless access point 14 of a wireless portion of a LAN 15, such that the mobile device itself may be an addressable endpoint on the LAN 15, i.e., the mobile device may be assigned an IP address and may be capable of IP communications with other devices over the LAN 15 using IP protocols such as Transmission Connection Protocol (TCP), Uniform Datagram Protocol (UDP), etc. The wireless access point 14 and the LAN communications module 56 may function in accordance with any known wireless communications protocol, including but not limited to the IEEE 802.11 standards, which are sometimes referred to as Wi-Fi™.

The WAN communications module 54 may utilize Wideband Code Division Multiple Access (WCDMA), High Speed Packet Access (HSPA), cdma2000, Long Term Evolution (LTE) technology, or other similar long-range wireless communication protocols for communication with a wide area wireless Internet service provider (ISP). For example, the ISP may be a mobile telephone service provider and the wireless WAN communications module 54 may be a system for wireless data communications with the access towers of the wireless ISP network 17 (i.e., WAN). Such wireless data communications may occur in accordance with any suitable wireless communication standard, including Third Generation (3G) standards (e.g., Universal Mobile Telecommunication Systems (UMTS), cdma2000, Enhanced Data Rate for GSM Evolution (EDGE), etc.) and/or Fourth Generation (4G) standards (e.g., LTE, Mobile WiMAX, etc.). The wireless ISP network 17 may assign an IP address to the mobile device such that the mobile device may be capable of IP communications with other devices over the wireless ISP network 17 using IP protocols such as TCP, UDP, or the like.

The mobile device 18c may include a processor 44 and memory 46 in electronic communication with the processor 44. The processor 44 may be embodied as a combination of one or more microprocessors, microcontrollers, digital signal processors (DSP), or the like, and, when operating, may execute instructions (in the form of an operating system and/or applications) stored in the memory 46. The memory 46 may be any component capable of storing electronic information, including an operating system and/or application instructions executable by the processor 44, and may be embodied as read-only memory (ROM), random access memory (RAM), magnetic disk storage media, optical storage media, flash memory devices, on-board memory included with the processor 44, erasable programmable read-only memory (EPROM), electrically erasable programmable read-only memory (EEPROM), and/or registers, etc.

The memory 46 may include an operating system 48, a barcode-reading application 24 (which may include a process management code 59c and a license key 26), one or more other applications 50a, 50b, and a data buffer including an image data buffer 89.

In operation, the processor 44 may execute instructions embodied in the operating system 48, the barcode-reading application 24, and each of the other applications 50a, 50b. The processor 44 may further include a real time clock 71 to enable the mobile device to determine the time at which a barcode is read.

Hardware circuits 90 interface the processor 44 with peripheral systems including, but not limited to, a (multi-touch) display screen 240, a wireless communication system 52, a hardwired point-to-point communication interface 60, a camera assembly 36, and other peripheral systems, including auxiliary data input systems such as a GPS location system 73 or other system for determining the location of the mobile device 18c.

The hardwired point-to-point communication interface 60 may utilize Universal Asynchronous Receiver/Transmitter (UART), Universal Serial Bus (USB), and similar communication protocols for communicating with a compatible system connected to a data connector 64b (which may be a part of a single power/data connector such as a USB connector or an Apple® Lightning Connector®).

The camera assembly 36 may include a (color) photo sensor 42 (i.e., an array of image sensors). The photo sensor 42 may be positioned parallel to each of the face surface and the back surface of the mobile device 18. The camera assembly 36 may also include a lens assembly 40 with an optical axis 39 orthogonal to the photo sensor 42 and defining a center line of a camera field of view 38 extending outward from the back surface of the mobile device 18. The photo sensor 42 may include one or more sensors such as charge-coupled display (CCD) sensors, complementary metal-oxide-semiconductor (CMOS) sensors, or the like.

The lens assembly 40 may receive light reflected from objects within the camera field of view 38. The camera field of view 38 may have an angular size 41 which may be the angle at which the camera field of view 38 spreads with respect to distance from the lens assembly 40. The lens assembly 40 may have a camera aperture size measured as an f-number which is the ratio of the focal length of the lens assembly 40 to the diameter of the entrance pupil (i.e., the lens aperture (an aperture stop or an inherent aperture of the lens component defining the aperture) as viewed through the front of the lens assembly 40).

The camera assembly 36 may further include an auto zoom module 96 and/or an autofocus module 98 which may serve to control an optical zoom setting and/or autofocus setting of the camera, respectively. Autofocus and auto zoom may be controlled by moving the position of at least one of the lenses making up the lens assembly 40 with respect to each other (or with respect to the photo sensor 42) and/or altering the curvature of at least one of the lenses making up the lens assembly 40.

In general, the camera lens assembly 40 and the autofocus module 98 (which compensates for limited depth of field at larger apertures) and the auto zoom module 96 (which adjusts the angular size 41 and image magnification) are designed and/or optimized for general-purpose photography, and may therefore not be ideal for barcode capture and/or decoding. More specifically, in a barcode-reading application an operator expects to read and decode a barcode in less than 300 ms. The focus and zoom adjustment process may require significantly more time and therefore, if used, it would significantly delay the response time in a barcode-reading application.

If the camera lens assembly 40 is fixed (e.g., not adjusted for focus and zoom) at any particular focus and/or zoom setting for the lens assembly 40, the combination of the angular size 41 and the camera aperture size affect the camera depth of field (e.g., the range of distances at which a barcode of a particular modular size is imaged onto the photo sensor with sufficient size and sharpness for decoding). The angular size 41 affects the minimum distance at which a barcode of a certain overall size can be imaged onto the photo sensor 42.

The photo sensor 42 may be coupled to system-on-chip control circuits 92. In one embodiment, the control circuits 92 may control the operation of the photo sensor 42 (e.g., exposure, gain, and coupling of pixels to analog-to-digital (A/D) converters for image read out), format the digital intensity values of each pixel of the photo sensor 42 for color image output, and make the color image output available for writing to the image data buffer 89.

In another embodiment, the control circuits 92 may include output module 91 which may perform image processing on images captured by the photo sensor 42. Control of the photo sensor 42 and image pre-processing which may be performed by the system on chip circuits 92 are described in more detail in U.S. patent application Ser. No. 14/717, 112, entitled "BARCODE READER" and filed on May 20, 2015, which is hereby incorporated by reference in its entirety (Reference 3271-2-071) (the "112 Application"). As such, the digital image output 262 (which may be the color image or a result of processing the image one or more times in accordance with the teachings of U.S. patent application Ser. No. 14/717,112) may be written to the image data buffer 89. The mobile device 18 may include a direct memory access (DMA) system 86 which may be a part of the processor 44. The DMA system 86 provides for direct writing of the digital image output 262 from the camera assembly 36 to the image data buffer 89.

The camera assembly 36 may further include a white light source 84. The white light source 84 may include one or more LEDs 84a, 84b controlled by the system-on-chip circuits 92.

In an exemplary embodiment, a first LED 84a may be a white LED. The color of a white LED is typically described using a Kelvin temperature scale with 1500° K representing a warm color "white," such as that of candlelight, and 9500° K representing a cool color "white," such as that of a blue sky. The exemplary white LED may be within this range. Alternatively, the exemplary white LED may have a color between 4000° K and 7000° K.

In the exemplary embodiment the second LED 84b may be an amber LED emitting illumination within the 600-615 nm range. Both the first LED 84a and the second LED 84b may be positioned behind a common optic 85 which directs illumination within a field of illumination 83 projecting away from the back surface and having an illumination axis perpendicular to the back surface and an illumination angle 87 which substantially coincides with the field of view 38 of the camera assembly 36. In operation, the system-on-chip circuits 92 may control each LED 84a, 84b independently; and control the intensity of each LED 84a, 84b independently such that the color of the white illumination of the combined LEDs may be controlled by controlling the intensity of the amber LED with respect to the intensity of the white LED. If the intensity of the amber LED is higher, the white color of the combination will be warmer (lower Kelvin temperature). If the intensity of the amber LED is lower, the color approaches the Kelvin temperature of the white LED alone.

The mobile device 18c may further include a battery 62 and power circuits 63. In general the power circuits 63 control charging of the battery 62 from power received from an external power source via the power connector 64a and providing operating power at the voltage and current drawing requirements of the various components of the mobile device 18 from the power received from the battery 62 or the external power source (when connected to the external power source).

Figure 3:
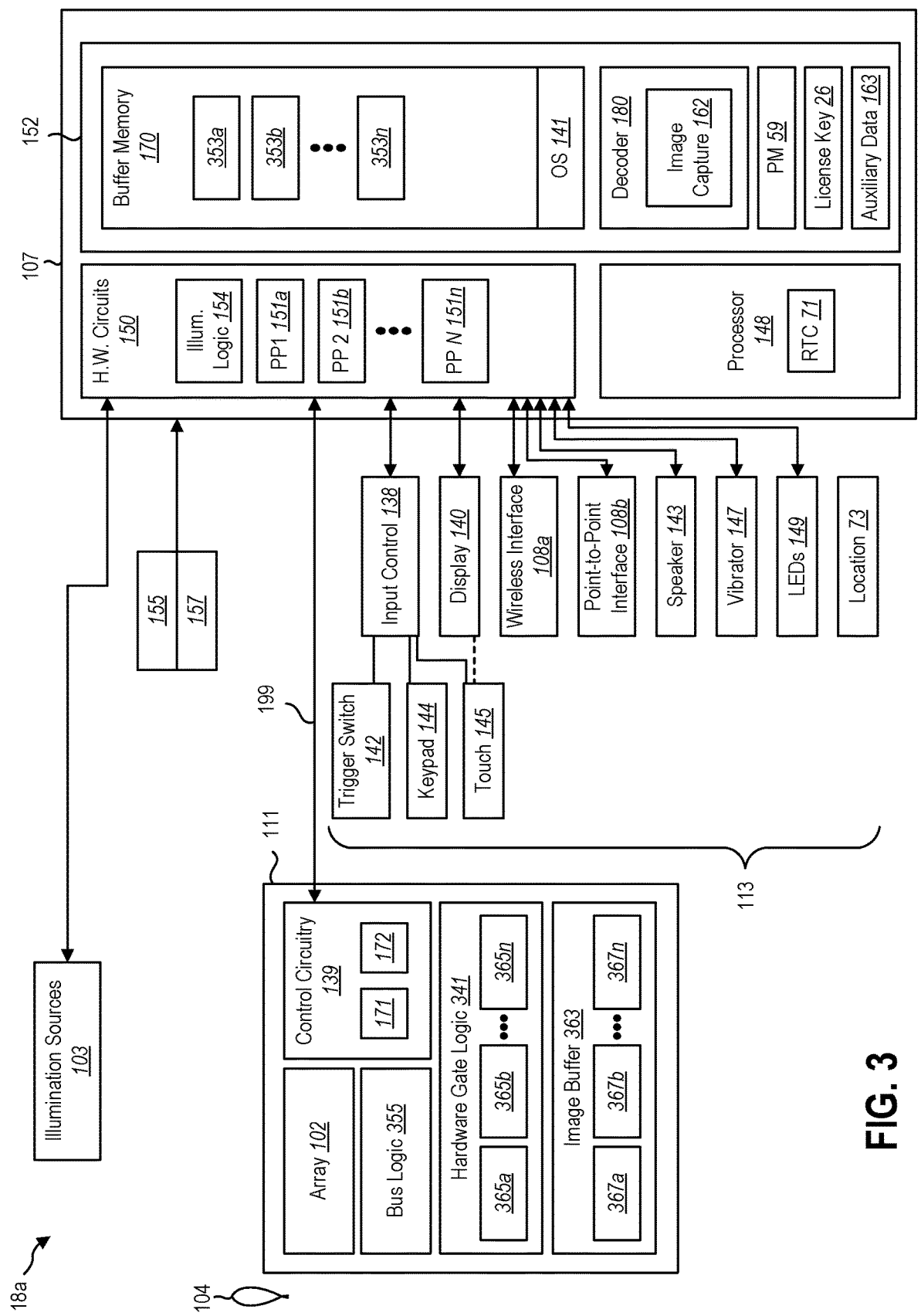
FIG. 3 illustrates an embodiment of a smart barcode reader that may be used in the system shown in FIG. 1.

Referring to FIG. 3 in conjunction with FIG. 1, each smart barcode reader 18a may include an image capture control and decode system 107, an image sensor system package 111, and an illumination system including illumination logic 154 and one or more illumination sources 103, and various input/output (I/O) peripheral systems 113.

The image sensor system package 111 and the image capture control and decode system 107 may be included in two separate packages, each of which may include one or more silicon dies that may include: i) a processor; ii) hardware circuits including digital signal processing and/or gate logic; and iii) memory. The processor may be a general-purpose single or multi-die microprocessor (e.g., an ARM), a special purpose microprocessor (e.g., a digital signal processor (DSP)), a microcontroller, a programmable gate array, etc. The processor may be referred to as a central processing unit (CPU). The memory may be any combination of non-volatile memory or storage and volatile memory or storage. The non-volatile memory may include a combination of read-only memory (ROM) and/or flash memory.

The illumination system may include one or more illumination sources 103 and illumination logic 154. The illumination sources 103 may be, for example, light-emitting diodes (LEDs). The illumination logic 154 may be configured to activate one or more of the illumination sources 103 to emit illumination into a target area.

The I/O peripheral systems 113 may include a user interface comprising input control 138 and/or a display 140. The input control 138 may include a trigger switch 142, a keypad 144, and/or a touch panel 145, such as a touch screen over the display 140. In addition, the smart barcode reader 18a may have one or more output devices that convey information to a user. Such output devices may include the touch panel 145, which may be a touch screen, a speaker 143, a vibrator 147, and/or one or more components that illuminate in a manner visible to a user, such as one or more light-emitting diodes (LEDs) 149.

The I/O peripheral systems 113 may further include one or more communication interfaces 108. The communication interfaces 108 may include: i) a wireless interface 108a which may be a wireless local area network (LAN) interface or a wide area network (WAN) interface; and ii) a point-to-point interface 108b which may be a wireless point-to-point interface and/or a hardwired point-to-point interface.

The LAN interface may utilize Wi-Fi™ (IEEE 802.11) or similar wireless local area communication protocols for communication with a wireless access point 14 of a wireless portion of a LAN 15, such that the smart barcode reader 18a itself may be an addressable endpoint on the LAN 15, i.e., the smart barcode reader 18a may be assigned an IP address and may be capable of IP communications with other devices over the LAN 15 using IP protocols such as Transmission Connection Protocol (TCP), Uniform Datagram Protocol (UDP), etc. The wireless access point 14 and the LAN interface may function in accordance with any known wireless communications protocol, including but not limited to the IEEE 802.11 standards, which are sometimes referred to as Wi-Fi™.

The WAN interface may utilize Wideband Code Division Multiple Access (WCDMA), High Speed Packet Access (HSPA), cdma2000, Long Term Evolution (LTE) technology, or other similar long-range wireless communication protocols for communication with a wide area wireless Internet service provider (ISP). For example, the ISP may be a mobile telephone service provider and the wireless WAN interface may be a system for wireless data communications with the access towers of the wireless ISP network 17 (i.e., WAN). Such wireless data communications may occur in accordance with any suitable wireless communication standard, including Third Generation (3G) standards (e.g., Universal Mobile Telecommunication Systems (UMTS), CDMA2000, Enhanced Data Rate for GSM Evolution (EDGE), etc.) and/or Fourth Generation (4G) standards (e.g., LTE, Mobile WiMAX, etc.). The wireless ISP network 17 may assign an IP address to the smart barcode reader 18a such that the smart barcode reader 18a may be capable of IP communications with other devices over the wireless ISP network 17 using IP protocols such as TCP, UDP, or the like.

The wireless point-to-point interface(s) 108b may be, for example, a Bluetooth® interface to enable the smart barcode reader 18a to establish a wireless point-to-point communication link with, and communicate over the wireless communication link with, a host device (i.e., a host computer).

The hardwired point-to-point interface(s) 108b may comprise a Universal Asynchronous Receiver/Transmitter (UART) or a Universal Serial Bus (USB). In one or more embodiments, the barcode reader may utilize the point-to-point interface(s) 108b to establish a point-to-point connection with a host device using a multi-conductor data interface.

The image capture control and decode system 107 may include: i) a processor 148; ii) a memory 152; and iii) hardware circuits 150 for coupling to, and driving operation of, each of the illumination sources 103, the I/O peripheral systems 113, and the image sensor system package 111.

The processor 148, as described, may be a general-purpose single or multi-die microprocessor (e.g., an ARM), a special purpose microprocessor (e.g., a digital signal processor (DSP)), a microcontroller, a programmable gate array, etc. The processor 148 may be referred to as a central processing unit (CPU). Although just a single processor 148 is shown in FIG. 1, in an alternative configuration, a combination of processors (e.g., an ARM and DSP) may be used.

The processor 148 may further include a real time clock 71 to enable smart barcode reader 18a to determine the time at which a barcode is read.

The I/O peripheral systems 113 may further include auxiliary data input systems such as a GPS location system 73 or other system for determining the location of the reader 18a.

The hardware circuits 150 may provide an interface between the image capture control and decode system 107 and each of the illumination sources 103, the I/O peripheral systems 113, and the image sensor system package 111. The hardware circuits 150 may further include illumination logic 154 and pre-processing circuits 151a-n, each of which will be described in more detail herein.

The memory 152, as described, may be any combination of non-volatile memory or storage and volatile memory or storage. The memory 152 may include a buffer memory 170 (e.g., an image buffer), a decoder 180, and an image capture module 162. These components may be stored in any combination of volatile and non-volatile memory. Some modules may be stored in both volatile and non-volatile memory, for example, with permanent storage of the module in non-volatile memory and a temporary copy stored in volatile memory for execution by the processor 148. In addition to, or as an alternative to, these modules, the memory 152 may store any number of other modules including but not limited to those set forth in the patent applications incorporated by reference in this disclosure. Additional detail with regard to one or more components of the image capture control and decode system 107 is included below.

As mentioned in some detail above, and as shown in FIG. 1, the smart barcode reader 18a additionally includes the image sensor system package 111, which may include: i) a two-dimensional photo sensor array 102 onto which illumination from the field of view of the smart barcode reader 18a is focused by an optic system 104 (e.g., one or more lenses for focusing an image of a barcode); ii) hardware gate logic 341 implementing one or more pre-processing circuits 365a-n; iii) volatile memory or storage such as random access memory implementing an image buffer 363; iv) hardware gate logic implementing bus logic 355 for transferring each image frame captured by the photo sensor array 102 to the hardware gate logic 341 (or the image buffer 363); and v) control circuitry 139. The control circuitry 139 may include a combination of gate logic, volatile memory or storage, and a processor executing code stored in the memory implementing control of the photo sensor array 102 (image read-out), the bus logic 355, the hardware gate logic 341, and the image buffer 363. The control circuitry 139 can transfer image data records to the image capture control and decode system 107. The control circuitry 139 may include exposure circuitry 171 that defines an exposure period for the photo sensor array 102. The control circuitry 139 may also include readout circuitry 172 that is configured to read out image data from the photo sensor array 102. The control circuitry 139, control of the photo sensor array 102 and image pre-processing which may be performed as described in more detail in U.S. patent application Ser. No. 14/717, 112, entitled "BARCODE READER" and filed on May 20, 2015, which is hereby incorporated by reference in its entirety (Reference 3271-2-071) (the "112 Application").

As mentioned above, the hardware circuits 150 include illumination logic 154 for controlling illumination provided by the illumination sources 103. The illumination logic 154 may control the illumination sources 103 to illuminate a field of view of the smart barcode reader 18a. Advantageously, control of the illumination sources 103 may occur without the use of any signals from the image sensor system package 111. For example, the illumination logic 154 may control the illumination sources 103 without receiving or otherwise depending on any signals from the photo sensor array 102 or any other components of the image sensor system package 111.

In one or more embodiments, the decoder 180 and/or image capture module 162 may provide illumination parameters to the illumination logic 154. The illumination parameters control the illumination settings to be used for capture of an image frame. More specifically, the illumination parameters may define such illumination settings as: i) identifying one or more illuminators to activate over a duration of time; and ii) the intensity of illumination to be generated by one or more of the illuminators to be activated. In certain exemplary embodiments the intensity may be defined as: i) a percentage from zero percent (0%) to one hundred percent (100%) representing the percent of a maximum illumination intensity that can be generated by the illumination sources 103; ii) pulse-width-modulation (PWM) parameters representing a percentage of a pulse cycle for which maximum operating power is applied to the illumination sources 103 in a pulsing pattern; and iii) a percentage greater than one hundred percent (100%) representing a power level to be applied if the illumination sources 103 are to be over-driven.

In certain embodiments, the illumination parameters may be provided to the illumination logic 154 for one or more image frames within a burst of image frames to be captured by the photo sensor array 102 by the image capture module 162 writing the illumination parameters for each frame to a distinct register within the illumination logic 154.

In the smart barcode reader 18a depicted in FIG. 3 the hardware circuits 150 include a number of pre-processing circuits 151a-n, which may be implemented within the gate logic of the hardware circuits 150. The pre-processing circuits 151a-n may perform operations such as convolution, binning, sub-sampling and other image processing functions on image data provided by the image sensor system package 111 via the bus 199, as described in the 112 Application. The pre-processing circuits 151a-n may perform operations as described in the 112 Application and write one or more image data records 153a-n to the buffer memory 170.

The image capture control and decode system 107 may include a decoder 180. The decoder 180 may be configured to (i) determine which of one or more image data records 367a-n (or windows within one or more image data records 167a-n) may be transferred from the image buffer 363 to the image capture control and decode system 107; ii) determine a permutation of one or more pre-processing functions (performed by pre-processing circuits 151a-n) to apply to each of the image data records 367a-n (or windows within one or more image data records 367a-n) to generate, and write to the buffer memory 170, image data records 353a-n, each of which may also be a derivative of the one or more image frames (whether full, binned, or sub-sampled) captured by the photo sensor array 102; iii) determine a permutation of one or more pre-processing functions to apply to each of the image data records 353a-n (or windows within one or more image data records 353a-n) to generate, and write to the buffer memory 170, additional (or replacement) image data records 353a-n, each of which may also be a derivative of the one or more image frames (full, binned, sub-sampled, and/or cropped) captured by the photo sensor array 102; and iv) decode the barcode present within the field of view of the barcode reader 100 and imaged within the one or more image frames (whether full, binned, or sub-sampled) captured by the photo sensor array 102 and represented by at least a portion of one of the image data records 353a-n derived from such image frame.

The smart barcode reader 18a may include a processor 148 may be embodied as a combination of one or more microprocessors, microcontrollers, digital signal processors (DSP), or the like, and, when operating, may execute instructions (in the form of an operating system and/or applications) stored in the memory 152. The memory 152 may be any component capable of storing electronic information, including an operating system and/or application instructions executable by the processor 148, and may be embodied as read-only memory (ROM), random access memory (RAM), magnetic disk storage media, optical storage media, flash memory devices, on-board memory included with the processor 148, erasable programmable read-only memory (EPROM), electrically erasable programmable read-only memory (EEPROM), and/or registers, etc.

The memory 152 may include an embedded operating system, a barcode-reading application comprising the image capture module 162 and the decoder 180, and a license key 26.

In operation, the processor 148 may execute instructions embodied in the embedded operating system, the image capture module 162 and the decoder 180.

The smart barcode reader 18a may further include a battery 155 and power circuits 157. In general the power circuits 157 control charging of the battery 155 from power received from an external power source (not shown) and providing operating power at the voltage and current drawing requirements of the various components of the smart barcode reader 18a from the power received from the battery 155 or the external power source (when connected to the external power source).

Referring to FIG. 3 in conjunction with FIG. 1, in an exemplary embodiment, the operating system 141 may include an upgrade system 49 which obtains upgrades and newer versions of any of the decoder 180 and auxiliary data system 163 from and application download server 22a or 22b as descried later herein.

Figure 4A:
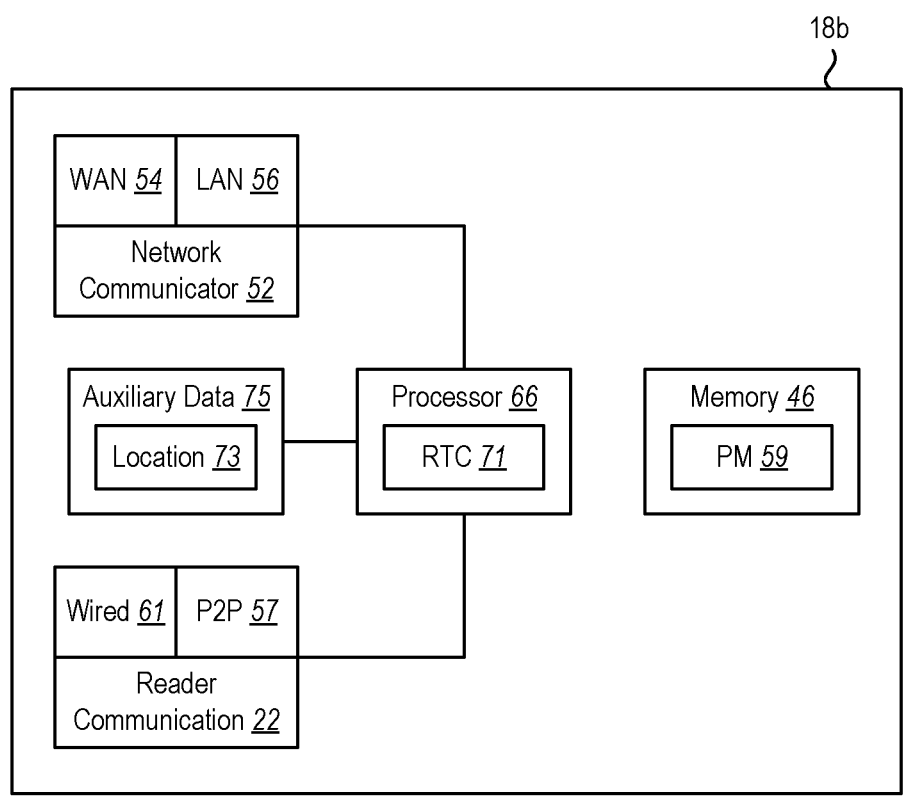
FIG. 4A illustrates an embodiment of a smart wedge device that may be used in the system shown in FIG. 1.

Referring to FIG. 4a in conjunction with FIG. 1, the smart wedge 18b: i) couples to, and receives decoded barcode data from, a traditional barcode reader 28; ii) forwards the decoded data to the applicable workflow server 23a-23b; iii) generates auxiliary data in relation to the forwarded decoded data; and iv) provides a combination of portions of the decoded data and/or the auxiliary data to one or more of the process management servers 25a-25b and/or data aggregation servers 33a-33b.

The smart wedge 18b may include: i) a processor 66; ii) memory including an embedded operating system; and iii) auxiliary data systems 75 including a GPS location system 73 or other system for determining the location of the smart wedge 18b.

The processor may be a general-purpose single or multi-die microprocessor (e.g., an ARM), a special purpose microprocessor (e.g., a digital signal processor (DSP)), a microcontroller, a programmable gate array, etc. The processor may be referred to as a central processing unit (CPU). The memory may be any combination of non-volatile memory or storage and volatile memory or storage. The non-volatile memory may include a combination of read-only memory (ROM) and/or flash memory.

The smart wedge 18b may further include one or more network communication interfaces 52. The network communication interfaces 52 may include: i) a wireless local area network (LAN) interface 56 and/or a wide area network (WAN) interface 54 which function as previously described and enable the smart wedge 18b to be an addressable endpoint on the LAN 15 (directly or via VPN) and provide decoded data from the traditional barcode reader 28 to the applicable workflow servers 23a-23b and provide permutations of at least part of the decoded data and auxiliary data to the process management servers 25a-25b and/or the data aggregation servers 33a-33b.

The smart wedge 18b may further include reader communication systems 22 for receiving decoded data from the traditional barcode reader 28. The reader communication systems 22 may include a point-to-point interface which may be a wireless point-to-point interface 57 and/or a hardwired point-to-point interface 61.

The LAN interface 56 may utilize Wi-Fi™ (IEEE 802.11) or similar wireless local area communication protocols for communication with a wireless access point 14 of a wireless portion of a LAN 15, such that the smart wedge 18b itself may be an addressable endpoint on the LAN 15, i.e., the smart wedge 18b may be assigned an IP address and may be capable of IP communications with other devices over the LAN 15 using IP protocols such as Transmission Connection Protocol (TCP), Uniform Datagram Protocol (UDP), etc. The wireless access point 14 and the LAN interface may function in accordance with any known wireless communications protocol, including but not limited to the IEEE 802.11 standards, which are sometimes referred to as Wi-Fi™.

The WAN interface 54 may utilize Wideband Code Division Multiple Access (WCDMA), High Speed Packet Access (HSPA), cdma2000, Long Term Evolution (LTE) technology, or other similar long-range wireless communication protocols for communication with a wide area wireless Internet service provider (ISP). For example, the ISP may be a mobile telephone service provider and the wireless WAN interface may be a system for wireless data communications with the access towers of the wireless ISP network 17 (i.e., WAN). Such wireless data communications may occur in accordance with any suitable wireless communication standard, including Third Generation (3G) standards (e.g., Universal Mobile Telecommunication Systems (UMTS), cdma2000, Enhanced Data Rate for GSM Evolution (EDGE), etc.) and/or Fourth Generation (4G) standards (e.g., LTE, Mobile WiMAX, etc.). The wireless ISP network 17 may assign an IP address to the smart wedge 18b such that the smart wedge 18b may be capable of IP communications with other devices over the wireless ISP network 17 using IP protocols such as TCP, UDP, or the like.

The wireless point-to-point interface(s) 57 may be, for example, a Bluetooth® interface to enable the smart wedge 18b to establish a wireless point-to-point communication link with, and communicate over the wireless communication link with, a traditional barcode reader 28 to receive decoded data therefrom.

The hardwired point-to-point interface(s) 61 may comprise a Universal Asynchronous Receiver/Transmitter (UART) or a Universal Serial Bus (USB). In one or more embodiments, the barcode reader may utilize the point-to-point interface(s) 61 to establish a point-to-point connection with the traditional barcode reader 18 to receive decoded data therefrom.

The processor 66 may further include a real time clock 71 to enable smart wedge 18b to determine the time at which a barcode is read.

The auxiliary data systems 75 may include systems such as a GPS location system 73 or other system for determining the location of the smart wedge 18b.

The memory 152 may include an embedded operating system, a process management code 59 and a license key 26 setting forth the licenses functions of the process management code 59.

In operation, the processor 148 may execute instructions embodied in the embedded operating system and the process management code 59 to obtain decoded data from the traditional barcode reader 28, determine and associate auxiliary data with the decoded data; and transmit permutations of the decoded data and the auxiliary data to the workflow servers 23a-23b, process management server 25a-25b and data aggregation servers 33a-33b.

Figure 4B:
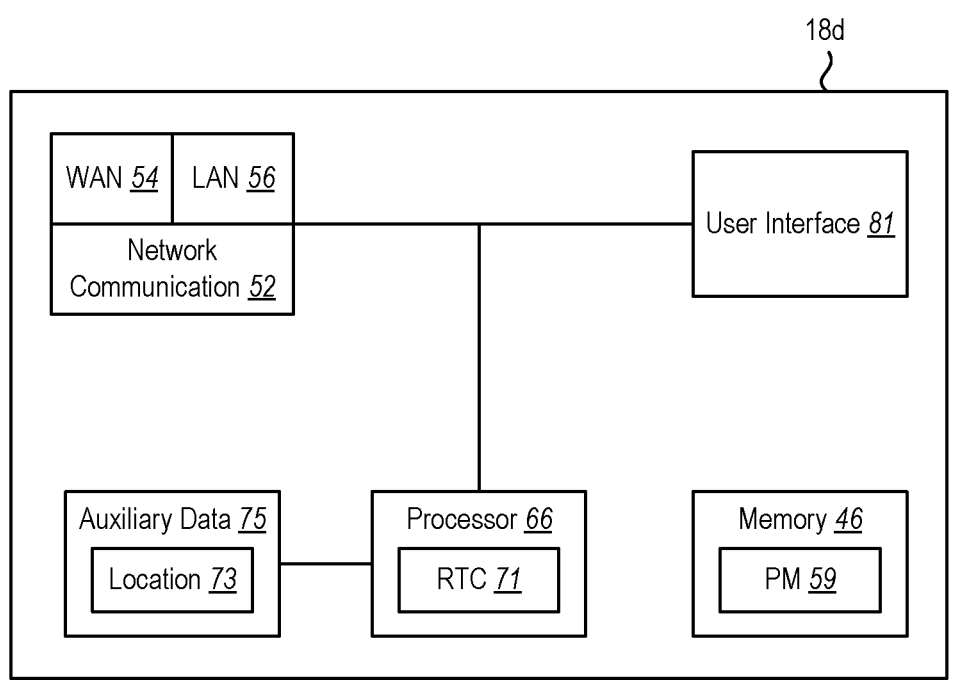
FIG. 4B illustrates an embodiment of a non-barcode reading process management device that may be used in the system shown in FIG. 1.

Referring to FIG. 4b in conjunction with FIG. 1, the non-barcode reading process management device 18d: i) generates auxiliary data in relation to the workflow supported by other process management devices 18a-18c and/or the barcode data captured by the other process management devices 18a-18c within the system 10; and ii) provides the auxiliary data to one or more of the process management servers 25a-25b and/or data aggregation servers 33a-33b.

The device 18d may include: i) a processor 66; ii) memory including an embedded operating system; and iii) auxiliary data systems 75 including a GPS location system 73 or other system for determining the location of the smart wedge 18b.

The processor may be a general-purpose single or multi-die microprocessor (e.g., an ARM), a special purpose microprocessor (e.g., a digital signal processor (DSP)), a microcontroller, a programmable gate array, etc. The processor may be referred to as a central processing unit (CPU). The memory may be any combination of non-volatile memory or storage and volatile memory or storage. The non-volatile memory may include a combination of read-only memory (ROM) and/or flash memory.

The device 18d may further include one or more network communication interfaces 52. The network communication interfaces 52 may include: i) a wireless local area network (LAN) interface 54 and/or a wide area network (WAN) interface 54 which function as previously described and enable the device 18d to be an addressable endpoint on the LAN 15 (directly or via VPN) and provide decoded data from the traditional barcode reader 28 to the applicable workflow servers 23a-23b and provide permutations of at least part of the decoded data and auxiliary data to the process management servers 25a-25b and/or the data aggregation servers 33a-33b.

The LAN interface 56 may utilize Wi-Fi™ (IEEE 802.11) or similar wireless local area communication protocols for communication with a wireless access point 14 of a wireless portion of a LAN 15, such that the device 18d itself may be an addressable endpoint on the LAN 15, i.e., the device 18d may be assigned an IP address and may be capable of IP communications with other devices over the LAN 15 using IP protocols such as Transmission Connection Protocol (TCP), Uniform Datagram Protocol (UDP), etc. The wireless access point 14 and the LAN interface may function in accordance with any known wireless communications protocol, including but not limited to the IEEE 802.11 standards, which are sometimes referred to as Wi-Fi™.

The WAN interface 54 may utilize Wideband Code Division Multiple Access (WCDMA), High Speed Packet Access (HSPA), cdma2000, Long Term Evolution (LTE) technology, or other similar long-range wireless communication protocols for communication with a wide area wireless Internet service provider (ISP). For example, the ISP may be a mobile telephone service provider and the wireless WAN interface may be a system for wireless data communications with the access towers of the wireless ISP network 17 (i.e., WAN). Such wireless data communications may occur in accordance with any suitable wireless communication standard, including Third Generation (3G) standards (e.g., Universal Mobile Telecommunication Systems (UMTS), cdma2000, Enhanced Data Rate for GSM Evolution (EDGE), etc.) and/or Fourth Generation (4G) standards (e.g., LTE, Mobile WiMAX, etc.). The wireless ISP network 17 may assign an IP address to the smart wedge 18b such that the smart wedge 18b may be capable of IP communications with other devices over the wireless ISP network 17 using IP protocols such as TCP, UDP, or the like.

The processor 66 may further include a real time clock 71 to enable device 18d to determine the time at which it is activated to generate auxiliary data. The auxiliary data systems 75 may include systems such as a GPS location system 73 or other system for determining the location of the device 18d.

The memory 152 may include an embedded operating system, the process management code 59 and a license key 26 setting forth the licenses functions of the process management code 59.

In operation, the processor 66 may execute instructions embodied in the embedded operating system and the process management code 59 to obtain decoded data from the traditional barcode reader 28, determine and associate auxiliary data with the decoded data; and transmit permutations of the decoded data and the auxiliary data to the workflow servers 23a-23b, process management server 25a-25b and data aggregation servers 33a-33b.

Returning to FIG. 1, the system 10 may include one or more local application download servers 22a-22b which make the barcode reading application 24 (and other applications 50a-50b) available to the mobile device 18c as well as making updates and/or upgrades to the process management code 59 available to any of the smart barcode reader 18a, smart wedge 18b, and non-barcode reading device 18d.

The system 10 may further include one or more license servers 21a-21b which may: i) make licensing entitlements (e.g., a license key 26) necessary for the operation of at least one function of the at least one decoder of the barcode-reading application 24 available to the mobile device 18c and the decoder of the smart barcode reader 18a; and ii) make licensing entitlements (e.g., a license key 26) necessary for operation of at least one function of the process management code 59 of the barcode reading application 24 to the mobile device 18c, the smart wedge 18b, and the non-barcode reading device 18d.

The application download server may be, for example, a local application download server 22a or a remote application download server 22b. Similarly, the license server may be a local license server 21a or a remote license server 21b. The application download server and the license server may operate on distinct hardware or may operate on the same hardware server. For example, the local application download server 22a and the local license server 21a may operate on the same hardware server 27 or on distinct hardware servers, each coupled to a local area network (LAN) 12. Similarly, the remote application download server 22b and the remote license server 21b may operate on the same hardware server 29 or on distinct hardware servers, each coupled to the Internet 16.

Referring to FIG. 2 in conjunction with FIG. 1, in an exemplary embodiment, the operating system 48 may include an application retrieval system 49 which obtains the barcode-reading application 24 (and the applications 50a, 50b) from and application download server 22a or 22b. In one embodiment, the operation of the application retrieval system 49, which may obtain the barcode-reading application 24 and the other applications 50a, 50b from the application download server 22a or 22b, may be the exclusive means for loading, writing, or otherwise placing the barcode-reading application 24 and the other applications 50a, 50b into the memory 46. The operating system 48 may be configured to block or prevent loading of any applications to the memory 46 by any means other than the operation of the application retrieval system 49 in a manner such that the applications 24, 50a, 50b may be retrieved exclusively from the application download server 22a or 22b.

In general, retrieval of the barcode reading application 24 and the licensing entitlement (e.g. license key 26) for barcode reading and ensuring the barcode data is routed to the applicable workflow servers 23a-23b is as described in more detail in U.S. patent application Ser. No. 16/112,413, entitled "ENTERPRISE-LEVEL LICENSING FOR A BARCODE DECODER WITHIN A MOBILE DEVICE APPLICATION" and filed on Aug. 24, 2018, which is hereby incorporated by reference in its entirety (Reference 3271-2-116) (the "413 Application").

Similarly, retrieval of the licensing entitlement (e.g. license key 26) for the process management module in any of the process management input devices 18a-18d may be performed as described with respect to retrieval of the license key 26 by a mobile device in the incorporated specification.

Figure 5:
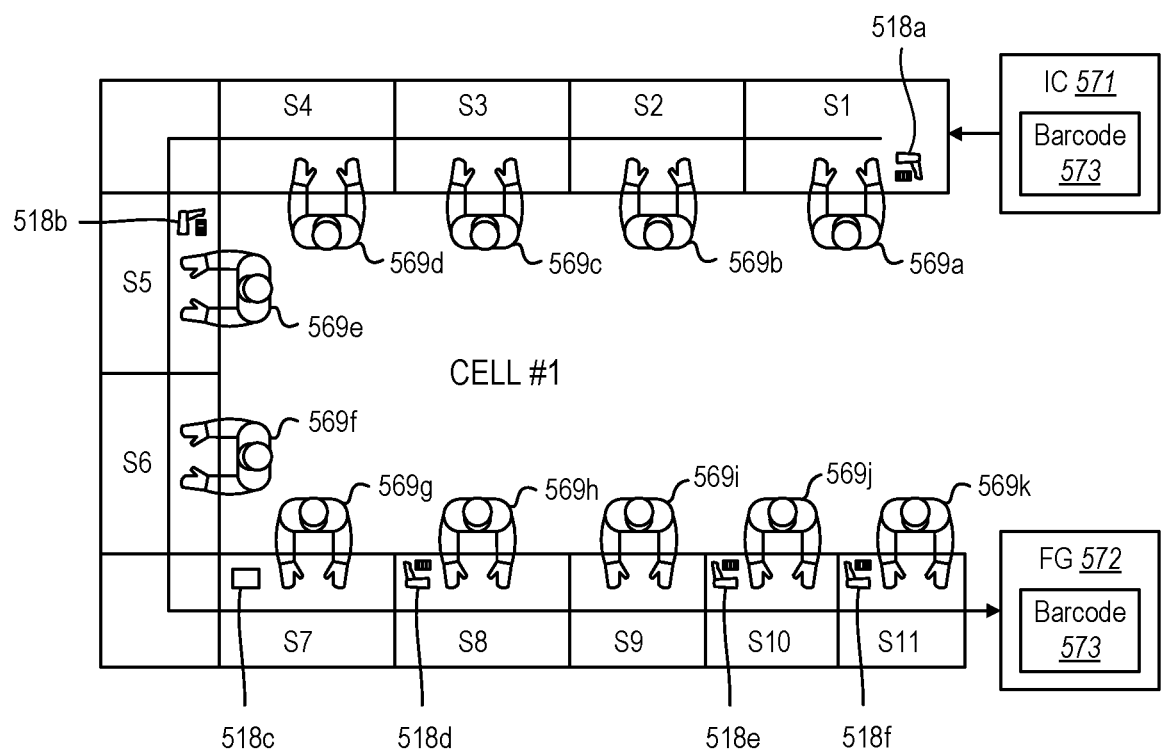
FIG. 5 illustrates a system, which may be an implementation of the system shown in FIG. 1, that includes plurality of stations.

FIG. 5 illustrates a system 500 (which may be an implementation of system 10 of FIG. 1) that includes plurality of stations S1-S11. The stations S1-S11 implement a workflow process. In this context, the term "workflow process" refers to a sequence of operations that is performed to accomplish a particular result. In the example shown in FIG. 5, it will be assumed that the stations S1-S11 are located in a manufacturing facility, and the workflow process is performed for the purpose of assembling a finished goods item 572. Workers 569a-k may be located at the various stations S1-S11. The workers 569a-k may perform various operations related to assembling the item 572 at the different stations S1-S11. The stations S1-S11 may be structured so that they form an assembly line. The assembly line may begin at station S1 and end at station S11. In other words, the assembly line may be structured so that an initial component (item 571) is initially provided to station S1 and the first operation in the sequence of operations is performed at station S1. After the operation at station S1 has been completed, the item 571 may then be passed to the next station, station S2, and the next operation in the sequence of operations may be performed there. After the operation at station S2 has been completed, the item 571 may then be passed to the next station, station S3, and the next operation in the sequence of operations may be performed there. This process may continue until the item 571 has been transformed to the finished good item 572 and is passed to station S11, which may be a quality testing station, and the final operation, which may be an inspection or test, in the sequence of operations is performed there.

The system 500 includes devices 518a-f that are located at some of the stations S1-S11. In particular, devices 518a-f are located at stations S1, S5, S7, S8, S10, and S11, respectively. At least some of these devices 518a-f may include barcode reading capability. For purposes of the present example, it will be assumed that all devices 518a-f (with the exception of 518c) include barcode reading capability. Thus, as part of the overall workflow process, barcodes may be read at the stations that include a device with barcode reading capability (e.g., stations S1, S5, S8, S10, and S11 in the present example). A barcode 573 may be attached to the initial component 571 that is being assembled. The barcode 573 may include the serial number of the initial component 571 and may also represent the serial number of the finished good item 572. The barcode 573 may be read at different points in time (e.g., at stations S1, S5, S8, S10, and S11) as the item 571 is moved between the stations S1-S11 during the workflow process.

The devices 518a-f in the system 500 may be any of the types of devices 18a-d described previously. For example, device 518c at station S7 may be a non-barcode reading process management input device 18d and at least some of the other devices 518a-f with barcode reading capability may be smart barcode readers 18a that include process management functionality. At least some of the devices 518a-f with barcode reading capability may be wedge devices 18b that are connected to barcode readers 28 that do not include process management functionality. At least some of the devices 518a-f with barcode reading capability may be mobile devices 18c that include a barcode reading application 24 that is configured to perform process management operations.

The devices 518a-f may be capable of performing process management operations that enable the efficiency of the workflow process to be evaluated. As discussed above, the process management operations may include determining auxiliary data corresponding to the workflow process. The auxiliary data may include metadata that is generated in connection with reading one or more barcodes 573 during the workflow process. The process management operations may also include sending the auxiliary data to one or more servers, such as the process management servers 25a-b and/or the data aggregation servers 33a-b.

The system 500 shown in FIG. 5 is provided for purposes of example only, and should not be interpreted as limiting the scope of the present disclosure. Many other types of systems may benefit from the techniques disclosed herein. For example, in some alternative embodiments, devices (such as the devices 518a-f in FIG. 5) may be located at each of the stations in the system (instead of just some of the stations, as in FIG. 5). As another example, in some alternative embodiments, machines may be used at some or all of the stations, either instead of or in addition to human workers 569a-k. The machines may include robotic components that perform some or all of the operations that are part of the workflow process. In those kinds of embodiments, the devices 518a-f (including the devices 518a-e with barcode reading capability) may be incorporated into the machines at the stations.

Figure 6:
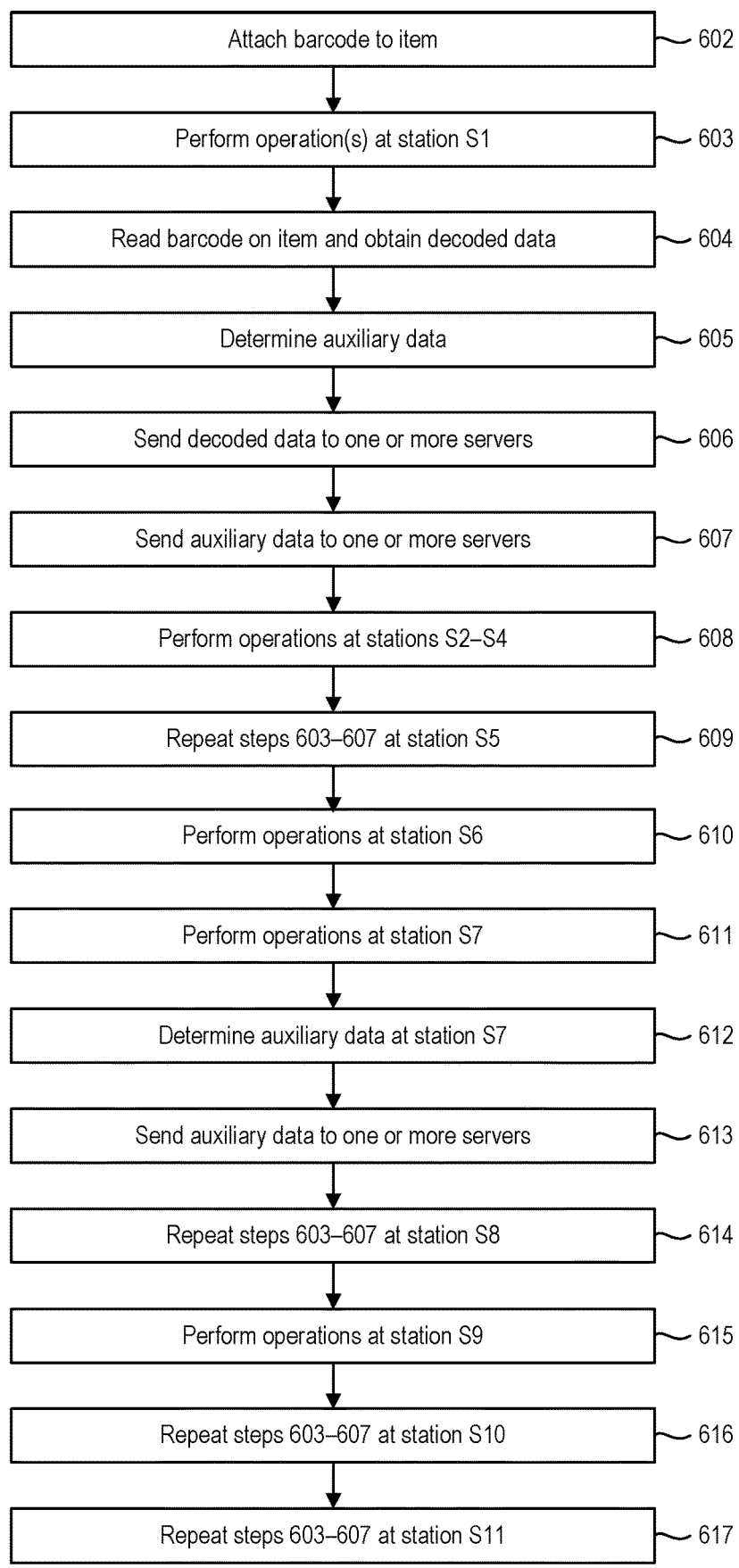
FIG. 6 illustrates an example showing how the devices located at some of the stations in the system shown in FIG. 5 may be used to perform process management operations.

FIG. 6 illustrates an example method 600 showing how the devices 518a-f located at stations S1, S5, S7, S8, S10, and S11 may be used to perform process management operations in connection with the workflow process that is implemented by the stations S1-S11 in the system 500 of FIG. 5.

As discussed above, the workflow process is performed for the purpose of assembling a finished good item 572 starting with an initial component 571. In step 602, a barcode 573 may be attached to the initial component 571. Encoded within the barcode 573 may be the serial number or other unique identifier of the initial component.

Step 603 represents operations related to the assembly of the item 571 being performed at station S1. For example, the initial component 571 may be "scanned-in" into the assembly process at station S1 by the worker 569a. More specifically, a device 518a with barcode reading capability is located at station S1. In step 603, the worker 569a at station S1 may perform one or more operations related to the assembly of the initial component 571. In step 604, the worker 569a may use the device 518a to read the barcode 573 that is attached to the item 571 and obtain decoded data corresponding to the barcode 573. In step 605, the device 518a determines auxiliary data corresponding to the workflow process. The auxiliary data may include metadata that is generated when the device 518a reads the barcode 573.

For example, the auxiliary data may include a timestamp that indicates the time when the device 518a reads the barcode 573 (e.g. the time the component with the serial number is "scanned-in" to the assembly line). In step 606, the device 518a may send the decoded data (e.g. the serial number of the initial component) to one or more servers, such as the workflow servers 23a-b in the system 10 shown in FIG. 1. In step 607, the device 518a may send the decoded data and auxiliary data to one or more other servers, such as the process management servers 25a-b and/or the data aggregation servers 33a-b in the system 10 shown in FIG. 1.

In the present example, it will be assumed that there are no devices that perform process management operations at stations S2-S4. Once the operation(s) at stations S2-S4 have been performed at step 608, then the item 571 may be provided to station S5 and the worker 569e at station S5 may perform one or more operations related to the assembly of the item 571. At station S5, a device 518b with barcode reading capability, maybe used by worker 569e, at step 609 repeat steps 604 to 607. More specifically, in repeating the steps step 603 may represent worker 569e performing one or more operation s related to the assembly which in this example may include combining the initial component 571 with another serialized component (e.g. a component with its own serial number. In repeating step 604, reading the barcode may include reading both the barcode 573 on the component and a barcode representing the serial number of the serialized component being combined with the initial component. Repeating step 605 may represent determining auxiliary data which again may be a time stamp. Repeating step 606 may represent sending both the serial number of the initial component (from barcode 573) and the serial number of the serialized component being combined with the initial component to the workflow servers 23a-23b so that the workflow servers may memorialize the combination of components. Repeating step 607 may represent sending the auxiliary data to the process management server 25a-25b.

Step 610 represents worker 569f performing processes at station S6 which includes no process management devices.

Step 611 represents one or more operations related to the assembly of the item 571 being performed at station S7. In the present example, it will be assumed that the device 518c at station S7 is a non-barcode reading device 18d that does not include barcode reading capability but is capable of performing process management operations. Once the operation(s) at station S7 have been performed, then the worker 569g at station S7 may use the device 518c to perform one or more process management operations. For example, the device 518c may determine auxiliary data at step 612, such as a timestamp indicating the time at which the workflow process at station S7 has completed with respect to the current item 571 being assembled. At step 613 the device 518c may send the auxiliary data to one or more servers, such as the process management servers 25a-b and/or the data aggregation servers 33a-b in the system 10 shown in FIG. 1. Because the device 518c does not include barcode reading capability, the worker 569g at station S7 may provide input to the device 518c through its user interface (e.g., by pressing a button on the device 5180 in order to cause the device 518c to determine the auxiliary data and send it to one or more servers.

Step 614 represents steps 603-607 being repeated at station S8. Thus, device 518d may be used to read the barcode 573 when the item 571 is at the corresponding station. In particular, the device 518d at station S8 may be used to read the barcode 573 after the worker 569h at station S8 has performed the relevant operation(s) on the item 571 at station S8. The device 518d may also obtain decoded data, determine auxiliary data, and send the decoded data and the auxiliary data to the appropriate destinations (which, as indicated above, may be different from one another).

Step 615 represents one or more operations related to the assembly of the item 571 being performed at station S9. In the present example, it will be assumed that there is not a device that performs process management operations at station S9.

Once the operation(s) at station S9 have been performed, then the item 571 may be provided to station S10. Step 616 represents steps 603-607 being repeated at station S10. The device 518e at station S10 may be used to read the barcode 573 after the worker 569j at station S10 has performed the relevant operation(s) on the item 571 at station S10. As discussed the barcode 573 may represent the serial number of the device. As such, an exemplary operation at Station S10 may include reading the barcode 573, sending the decoded data (e.g. serial number) to a relevant workflow server 23a-23b, and receiving at a printer (as directed by the workflow server) a serial number label for placement on the finished item 572.

The device 518e may also determine auxiliary data, and send the decoded data and the auxiliary data to the appropriate destinations (which, as indicated above, may be different from one another). For example, the serial number and time stamp at which the operator completes the operation may be sent to the process management servers 25a-25b.

Step 617 represents one or more operations related to the assembly of the item 571 being performed at station S11. In the present example, it will be assumed that station S11 is a quality control station at which the finished item 572 is tested. The device 518f at station S11 (which is the end of the assembly line) is a barcode reading device 18a-18c such that the barcode 573 can be read at the completion of a quality control check, thereby indicating that the finished item 572 is ready for shipment. In more detail, once the operation(s) at station S11 have been performed, then the worker 569k at station S11 may use the device 518f to perform one or more workflow and process management operations. For example, the device 518f may read the barcode and determine auxiliary data, such as a timestamp indicating the time at which the workflow process has completed with respect to the current item 571 being assembled. The device 518f may send the auxiliary data to one or more servers, such as the process management servers 25a-b and/or the data aggregation servers 33a-b in the system 10 shown in FIG. 1.

FIG. 7 illustrates an example of the auxiliary data 774 that may be collected by the devices 518a-f in connection with the assembly of various items such as the item 571 shown in FIG. 5. As indicated above, the auxiliary data 774 may include metadata that is determined by the devices 518a-f as the item 571 moves between the stations S1-S11. As shown in FIG. 7, the metadata may include a plurality of timestamps 775. Each timestamp 775 may be associated with a station ID 776, a user ID 777, and an item ID 778. Each station ID 776 may uniquely identify one of the stations S1-S11. Each user ID 777 may uniquely identify one of the workers 569a-k at the stations S1-S11. Each item ID 778 (or serial number) may uniquely identify a particular item that is being assembled (or otherwise worked on) at the stations S1-S11. For example, "Item1" may uniquely identify the item 571 shown in FIG. 5, "Item2" may uniquely identify a subsequent item that is assembled at the stations S1-S11, and so forth.

In some embodiments, the item IDs 778 may be included in the barcodes 573 that are attached to the items 571 being assembled. The timestamps 775, station IDs 776, and user IDs 777 may be determined by the devices 518a-f. The timestamps 775 may be determined by reference to an internal clock 71. The relevant station IDs 776 and user IDs 777 may be programmed into the devices 518a-f, by the workers 569a-k and/or by system administrators.

Alternatively, the relevant station IDs 776 may be encoded into a barcode at the particular station. Associating a device 518a-518f with a station may include reading a barcode with the station ID. Similarly, associating a device 518a-518f with a user may include reading a barcode with a User ID from a badge or other identification document associated with the user.

Each timestamp 775 may indicate a time at which the barcode 573 is read or another type of input is provided by one of the devices 518a-f. For example, the timestamp 775a associated with station S1 indicates the time at which the worker 569a at station S1 uses the device 518a at station S1 to read the barcode 573 on the initial component 571.

Similarly, the timestamp 775b associated with station S5 indicates the time at which the worker 569e at station S5 uses the device 518b at station S5 to read the barcode 573 on the item 571.

As another example, the timestamp 775e associated with station S7 indicates the time at which the worker 569g at station S7 provides input to the device 518c that indicates the time at which the workflow process has completed with respect to the item 571.

Although FIG. 5 shows just a single item 571, the workflow process implemented by the stations S1-S11 may be used to assemble (or perform other types of operations in connection with) a plurality of items. A separate barcode (similar to the barcode 573 that is attached to the item 571 shown in FIG. 5) may be attached to each item that is moved along the assembly line formed by the stations S1-S11. The barcode that is attached to a particular item may include information that identifies the item (e.g., an item ID 778).

Thus, in accordance with the present disclosure, a plurality of items may be assembled in accordance with the workflow process implemented by the stations S1-S11. The barcode that is attached to a particular item may be read by the devices 518a-e as that particular item moves along the assembly line that is formed by the stations S1-S11. As a plurality of items are assembled, the devices 518a-e may be used to read a plurality of different barcodes corresponding to the different items. The devices 518a-e may collect auxiliary data 774 including metadata that is generated in connection with reading the barcodes.

As indicated above, the auxiliary data 774 that is collected by the devices 518a-f may be sent to one or more servers, such as the process management servers 25a-b and/or the data aggregation servers 33a-b in the system 10 shown in FIG. 1. The server(s) that receive the auxiliary data 774 may use the auxiliary data 774, including the metadata contained therein, to determine metrics related to the workflow process.

For example, suppose that the local process management server 25a receives the auxiliary data 774 from the devices 518a-f. The server 25a may use the auxiliary data 774 to determine the time duration of one or more operations that are performed at a particular station. To determine this metric, the server 25a may calculate the difference between two timestamps 775 corresponding to two sequential barcode reads at the same station. For example, to determine the time duration of the operation(s) performed at station S5 with respect to "Item2," the server 25a may calculate the difference between the timestamp 775a corresponding to "Item1" and the timestamp 775c corresponding to "Item2."

The previous example assumes that the worker at a particular station reads the barcode 573 on the item 571 after the worker has performed the operation(s) on the item 571. Alternatively, the worker at a particular station could read the barcode 573 on the item 571 as soon as the worker receives the item 571 from the previous station, before the worker has performed any operations on the item 571. In such an embodiment, to determine the time duration of the operation(s) performed at station S5 with respect to "Item2," the server 25a may calculate the difference between the timestamp 775d corresponding to "Item3" and the timestamp 775c corresponding to "Item2."

In some embodiments, a minimum amount of time may be defined for the operation(s) that are performed at some or all of the stations. The minimum amount of time associated with a particular station may represent an estimate of the minimum amount of time that is required to adequately perform the operation(s) associated with that station. If the difference between two timestamps 775 corresponding to two sequential barcode reads at the same station is less than this defined minimum, some type of action may be taken. For example, in a manufacturing facility, the current barcode read may be rejected, and a supervisor may be notified. One benefit of defining a minimum amount of time for a particular station is that it discourages workers from taking an unauthorized break and then, upon returning, quickly reading several barcodes corresponding to several items (without performing the operation(s) that are assigned to the station) in an attempt to catch up.

As another example of a metric, the time duration of the operation(s) performed at a particular station may also be calculated as an average. For example, the time duration of the operation(s) performed at station S5 may be determined with respect to various items (e.g., "Item1," "Item2," "Item3," "Item4") in the manner described above. The average value of these metrics may then be calculated in order to determine the average time duration of operation(s) that are performed at station S5.

As another example, the average time duration of one or more operations that are performed at a particular station may be determined for different users. For example, suppose that a change is made to the worker at station S5 after "Item2" is assembled but before "Item3" is assembled. This is reflected in the auxiliary data 774 shown in FIG. 7, in which the user identifier 777 associated with station S5 is "User5" for "Item1", "Item2", and "Item3" and "User12" for "Item4", "Item5", "Item6", and "Item7". The server 25a may determine the average time duration of the operation(s) at station S5 for "User5" (by, for example, determining the time duration of the operation(s) at station S5 for "Item1", "Item2" and "Item3" and then taking the average of those values) and also for "User12" (by, for example, determining the time duration of the operation(s) at station S5 for "Item4". "Item5", "Item6" and "Item7," and then taking the average of those values).

Figure 8:
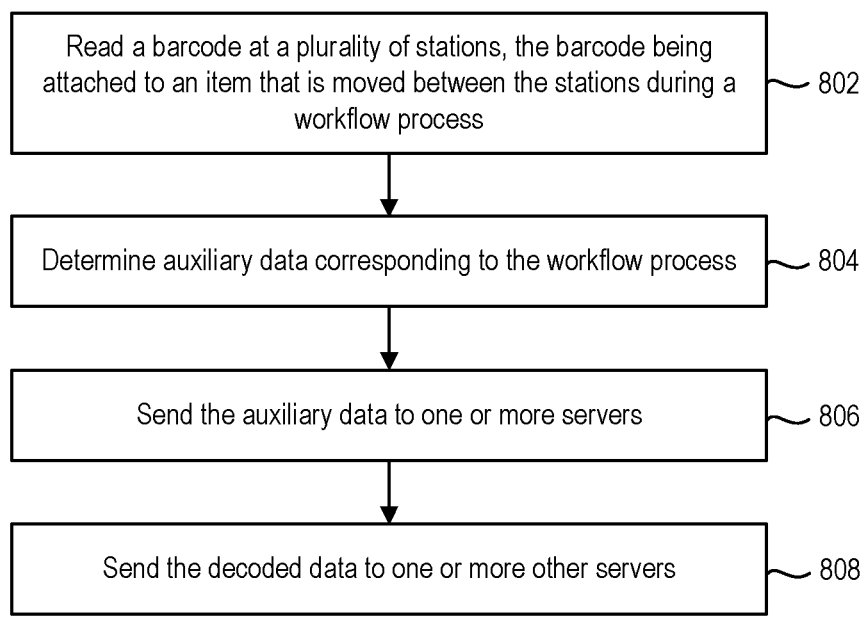
FIG. 8 illustrates a method that may be performed by devices at a plurality of stations that implement a workflow process.

FIG. 8 illustrates a method 800 that may be performed by devices at a plurality of stations that implement a workflow process. For the sake of clarity, the method 800 will be described in connection with the system 500 shown in FIG. 5, which includes stations S1-S11 and devices 518a-f at some of the stations.

Step 802 represents reading a barcode 573 at a plurality of stations (e.g., stations S1, S5, S8, S10, and S11 in the system 500 shown in FIG. 5). The barcode 573 may be attached to an item 571 that is moved between the stations S1-S11 during the workflow process.

Step 804 represents determining auxiliary data 774 corresponding to the workflow process. The auxiliary data 774 may include metadata, at least some of which may be generated in connection with reading the barcode 573 at the stations that include devices 518a-e with barcode reading capability (e.g., stations S1, S5, S8, S10, and S11 in the system 500 shown in FIG. 5). The metadata may include a plurality of timestamps 775. Each timestamp 775 may be associated with a station ID 776 and may indicate a time at which the barcode 573 is read (or another type of input is provided) at a station corresponding to the station ID 776.

Step 806 represents sending the auxiliary data 774 to one or more servers, such as the process management servers 25a-b and/or the data aggregation servers 33a-b in the system 10 shown in FIG. 1. Step 808 represents sending the decoded data that is generated in connection with reading the barcode 573 to one or more other servers, such as the workflow servers 23a-b in the system 10 shown in FIG. 1. In other words, the server(s) where the auxiliary data 774 is sent may be different from the server(s) where the decoded data is sent.

Figure 9:
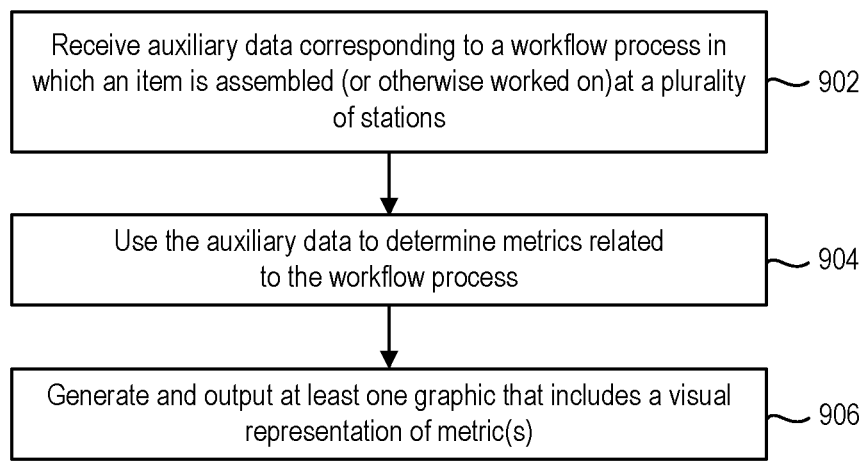
FIG. 9 illustrates a method that may be performed by one or more servers that receive auxiliary data.

FIG. 9 illustrates a method 900 that may be performed by one or more servers (e.g., the process management servers 25a-b and/or the data aggregation servers 33a-b in the system 10 shown in FIG. 1) that receive auxiliary data 774.

Step 902 represents receiving auxiliary data 774 corresponding to a workflow process in which an item 571 is assembled (or otherwise worked on) at a plurality of stations S1-S11. The auxiliary data 774 may be received from a plurality of devices 518a-f that are located at stations that implement the workflow process. The devices 518a-f may be used as part of the workflow process. As discussed above, as part of the workflow process, a barcode 573 that is attached to the item 571 may be read by some or all of the devices 518a-e that include barcode reading capability. Thus, as part of the workflow process, the barcode 573 may be read at those stations where the devices 518a-e are located (e.g., stations S5, S6, S7, S8, S10, and S11 in the system 500 shown in FIG. 5). The auxiliary data 774 may include metadata, at least some of which may be generated in connection with reading the barcode 573 at the stations that include devices 518a-e with barcode reading capability.

Step 904 represents using the auxiliary data 774 to determine metrics related to the workflow process. Various metrics may be calculated, such as the time duration of one or more operations that are performed at a particular station. This type of metric may be determined in connection with the assembly of a particular item 571, or as an average value corresponding to the assembly of a plurality of items. This type of metric may also be determined in connection with different users. Step 906 represents generating and outputting at least one graphic that includes a visual representation of the metric(s) that are determined in step 904.

Figure 10A:
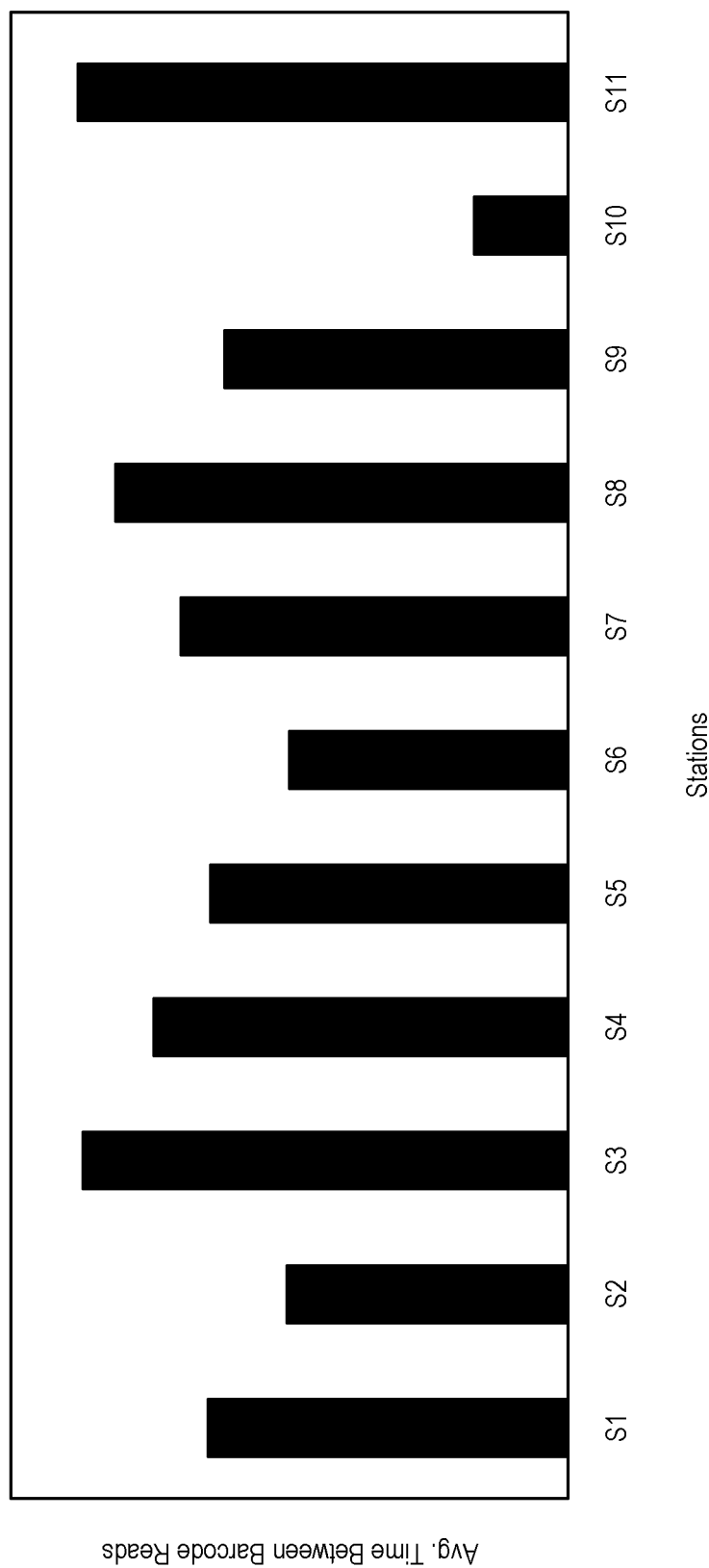
FIGS. 10A-C illustrate examples of graphics that may be generated and rendered in print or digital format to represent one or more metrics related to the workflow process.
Figure 10B:
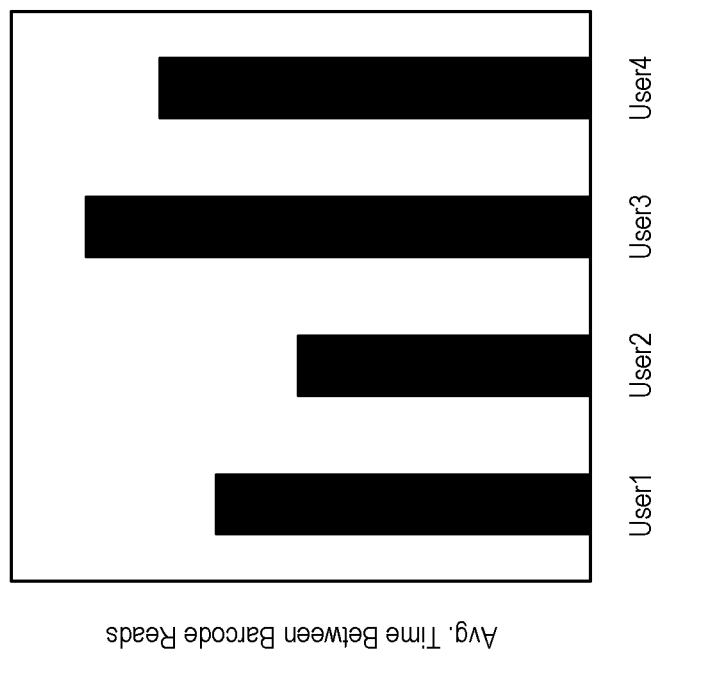
Figure 10C:
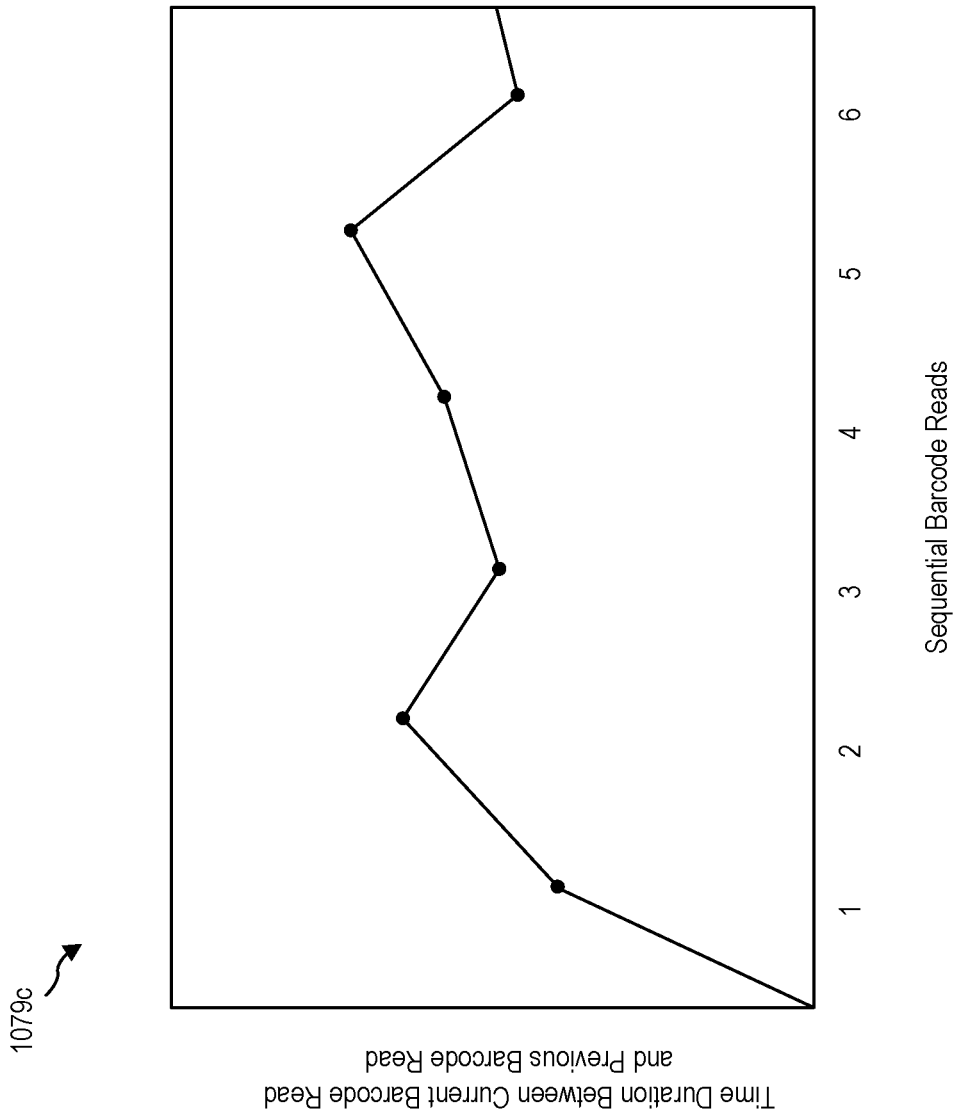

FIGS. 10A-C illustrate examples of graphics that may be generated and rendered in print or digital format to represent one or more metrics related to the workflow process. Reference is initially made to the graphic shown in FIG. 10A, which is a bar chart 1079a. The x-axis of the bar chart 1079a represents different stations (such as the stations S1-S11 in the system 500 shown in FIG. 5). The y-axis of the bar chart 1079a represents the average time between barcode reads at the various stations that are shown along the x-axis. From this bar chart 1079a, it can readily be seen which stations are taking longer than others. For example, the operations that are performed at stations S3 and S11 take significantly longer than the operations performed at station S10.

Reference is now made to the graphic shown in FIG. 10B, which is another bar chart 1079b. The x-axis of the bar chart 1079b represents different people working at a particular station at different times, which are identified as User1, User2, User3, and User4. The y-axis of the bar chart 1079b represents the average time between barcode reads for the various workers that are shown along the x-axis. From this bar chart 1079b, it can readily be seen which workers are more efficient than others. For example, the bar chart 1079b illustrates that User2 is the most efficient while User3 is the least efficient.

Reference is now made to the graphic shown in FIG. 10C, which is a line chart 1079c. The x-axis of the line chart 1079c represents sequential barcode reads at a particular station. For example, the number 1 denotes the first barcode read at a particular station, the number 2 denotes the second barcode read at that particular station, and so forth. The y-axis of the line chart 1079c represents the time difference between the current barcode read at a particular station and the previous barcode read at that particular station. From this line chart 1079c, it can readily be seen how the amount of time that it takes to perform operation(s) at a particular station fluctuates.

The graphics that are shown in FIGS. 10A-C are provided for purposes of example only, and should not be interpreted as limiting the scope of the present disclosure. Those skilled in the art will recognize that many other types of graphics may be generated to represent metric(s) in accordance with the present disclosure.

The graphics that are generated may be output in various ways. For example, the graphics may be displayed on a display device, sent to a printer, etc. If a server (e.g., one of the process management servers 25a-b) generates the graphics, the server may output the graphics to a local display device, a local printer, etc. Alternatively, the server may send the graphics in the form of an electronic file to one or more remote computing devices (e.g., a personal computer, a laptop computer, a tablet computer), which may then display, print, or otherwise output the graphics.

The metrics that are generated in relation to a workflow process (and the corresponding graphics that provide visual representations of the metrics) may be used to improve the workflow process. For example, a graphic like the bar chart 1079a shown in FIG. 10A may illustrate that the operations that are to be performed as part of the workflow process are not evenly distributed among the stations. Consequently, changes may be made so that the operations to be performed at the various stations are more evenly distributed. For example, a graphic like the bar chart 1079b shown in FIG. 10B may illustrate which workers are more efficient than others. This information can be useful for purposes of providing rewards to efficient workers, providing additional training to less efficient workers, etc.

Figure 11:
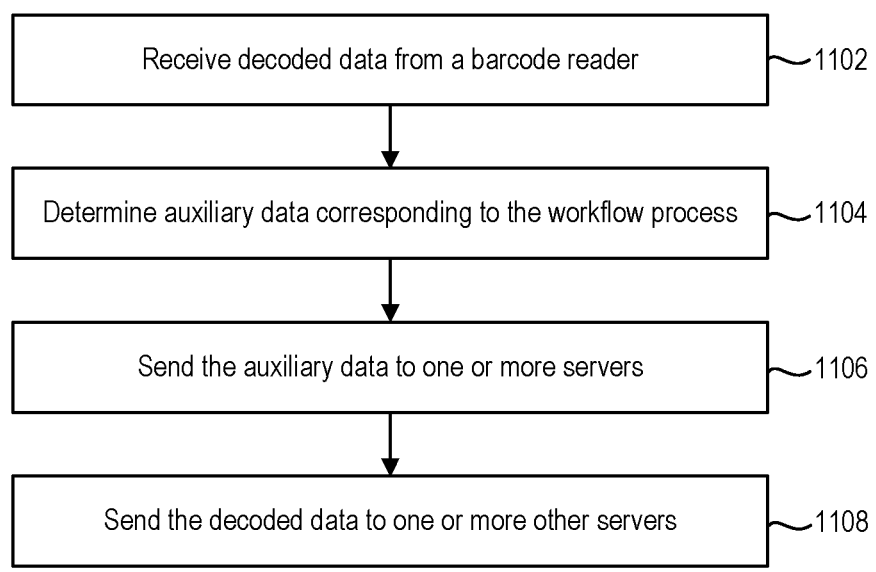
FIG. 11 illustrates a method that may be performed by a smart wedge device.

FIG. 11 illustrates a method 1100 that may be performed by a smart wedge device 18b. As discussed above, a smart wedge device 18b may be configured to be connected to a traditional barcode reader 28 that is not capable of performing process management operations. The smart wedge device 18b may be configured to perform one or more process management operations related to the barcode reading operations that are performed by the barcode reader 28.

Step 1102 of the method 1100 represents receiving decoded data from a barcode reader 28. The method 1100 may be implemented in a system 500 that includes a plurality of stations S1-S11 that implement a workflow process with respect to an item 571. The item 571 may move between the stations S1-S11 during the workflow process. The barcode reader 28 may be located at one of those stations S1-S11. The decoded data that the smart wedge device 18*b* receives from the barcode reader 28 may correspond to a barcode 573 that is attached to the item 571 and that is read by the barcode reader 28 when the item 571 is located at the station where the barcode reader 28 is located.

Step 1104 of the method 1100 represents determining auxiliary data 774 corresponding to the workflow process. The auxiliary data 774 may include metadata that is generated in connection with reading the barcode 573. For example, the auxiliary data 774 may include a timestamp 775 that indicates the time when the barcode reader 28 reads the barcode 573. The auxiliary data 774 may also include other data associated with the timestamp 775, such as a station ID 776, a user ID 777, and/or an item ID 778.

Step 1106 represents sending the auxiliary data 774 to one or more servers, such as the process management servers 25*a-b* and/or the data aggregation servers 33*a-b* in the system 10 shown in FIG. 1. Step 1108 represents sending the decoded data that is generated in connection with reading the barcode 573 to one or more other servers, such as the workflow servers 23*a-b* in the system 10 shown in FIG. 1. In other words, the server(s) where the auxiliary data 774 is sent may be different from the server(s) where the decoded data is sent.

As discussed above, a minimum amount of time may be defined for the operation(s) that are performed at some or all of the stations. For example, a minimum amount of time may be defined for a quality control station where the worker is supposed to inspect the item that has been assembled and ensure that it meets a certain threshold of quality. However, under some circumstances, workers may be tempted to not perform any type of inspection, but just read the barcode on the item being assembled. For example, a worker may take an unauthorized break and then, upon returning, quickly read several barcodes corresponding to several items (without performing any type of meaningful inspection of the items) in an attempt to catch up. Defining a minimum amount of time between barcode reads can prevent this type of behavior.

As shown in FIG. 1, the local process management server 25*a* may include a user interface (UI) 81*a*. Similarly, the remote process management server 25*b* may include a UI 81*b*. The UIs 81*a-b* may enable system administrators to specify a minimum amount of time for one or more stations. For example, referring to the system 500 shown in FIG. 5, suppose that system S11 is a quality control station. Someone involved with the administration of the system (e.g., a manager) may define, via either of the UIs 81*a-b*, a minimum amount of time between barcode reads for the device 518*f* at station S11. Once this parameter has been defined, a setting that implements this feature may be pushed down to the device 518*f* at station S11. For example, suppose that the device 518*f* at station S11 is a smart barcode reader 18*a* (as shown in FIG. 1). Once a minimum amount of time between barcode reads has been defined for the device 518*f*, the process management code 59*a* (shown in FIG. 1 on the smart barcode reader 18*a*) on the device 518*f* may be updated to reflect this setting. After the process management code 59*a* has been updated in this way, then the process management code 59*a* prevents the device 518*f* from reading barcodes too quickly. In other words, the device 518*f* will not read a new barcode until the minimum time has elapsed from the previous barcode.

Figure 12:
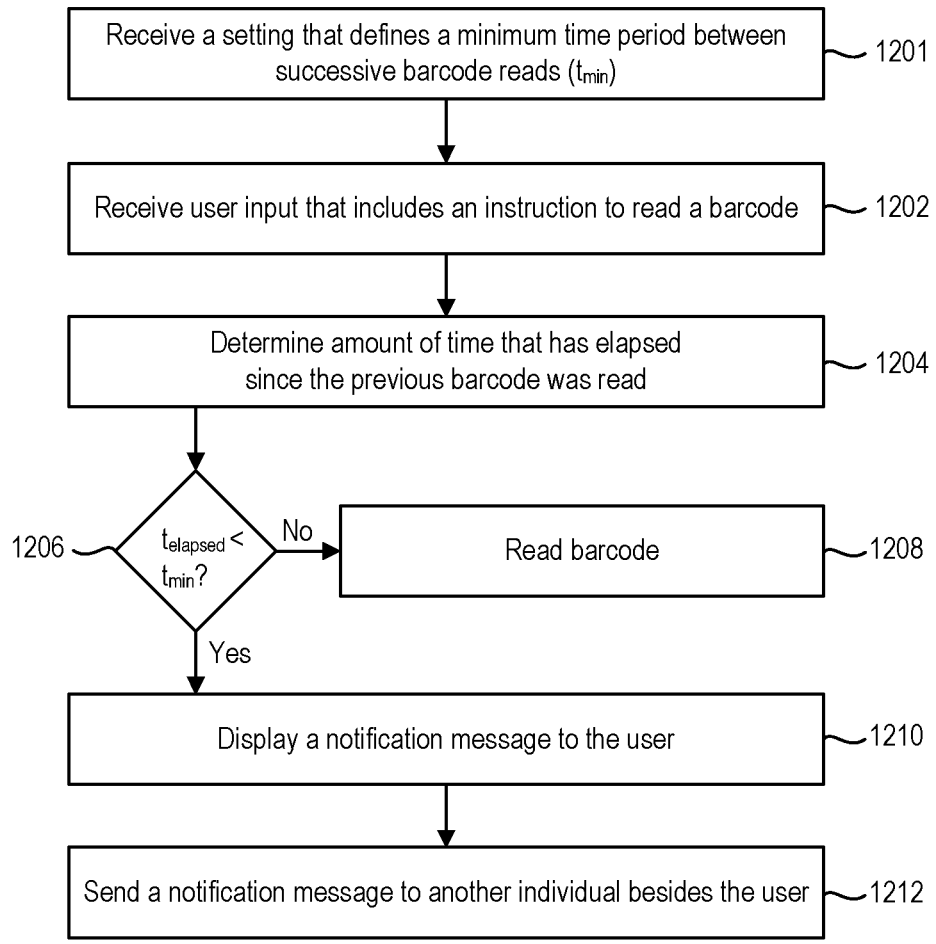
FIG. 12 illustrates an example of a method that may be implemented by a device for which a minimum time period between barcode reads has been defined.

FIG. 12 illustrates an example of a method 1200 that may be implemented by a device (e.g., the device 518*f* at station S11 in FIG. 5) for which a minimum time period between barcode reads has been defined. This minimum time period may be referred to herein as tmin. In step 1201 of the method 1200, the device 518*f* receives a setting that defines tmin. In step 1202 of the method 1200, the device 518*f* receives user input that includes an instruction to read a barcode. In response to receiving this user input, the device 518*f* determines, in step 1204, the amount of time that has elapsed since the previous barcode was read, which may be referred to herein as telapsed. This information may be stored locally on the device 518*f*. For example, the device 518*f* may store timestamps corresponding to the previous N barcode reads, where N may be a user configurable parameter.

In step 1206, the device 518*f* determines whether telapsed is less than tmin. If not, then in step 1208 the device 518*f* reads the barcode. After reading the barcode, the device 518*f* may perform one or more additional operations as described above, such as determining decoded data, determining auxiliary data, and sending the decoded data and the auxiliary data to different destinations.

If, however, in step 1206 the device 518*f* determines that telapsed is less than tmin, then the device 518*f* does not read the barcode. In other words, in accordance with the depicted method 1200, the device 518*f* reads the barcode only if telapsed is greater than or equal to tmin.

In addition to simply not reading the barcode, the device 518*f* may display and/or send notification messages about the attempt to read the barcode when telapsed is less than tmin. For example, in step 1210, the device 518*f* may display a notification message to the user of the device 518*f* (e.g., the worker) indicating that telapsed is less than tmin and that as a result the barcode is not going to be read. This notification message may be displayed on a display screen of the device 518*f*. Alternatively, instead of sending a notification message, the device 518*f* may provide another form of output indicating that the barcode will not be read, such as a particular sound.

As another example of a notification message that may be sent, in step 1212, the device 518*f* may send a notification message to a different device (e.g., a device used by the worker's supervisor). The notification message may indicate that an attempt was made to read a barcode when telapsed is less than tmin.

As discussed above, the auxiliary data that is collected may be used to determine metrics related to the workflow process, such as the average time between barcode reads at a particular station (either as an overall value or in connection with particular users). In accordance with another aspect of the present disclosure, these metrics may be monitored and, under some circumstances, particular actions may be taken when the metrics exceed (or fall below) certain pre-defined threshold values.

Someone involved with the administration of the system (e.g., a manager) may define, via either of the UIs 81*a-b* on the process management servers 25*a-b*, one or more threshold values that are relevant to the metrics that will be determined. In addition, one or more actions may be defined in connection with the threshold values. The process management servers 25*a-b* may then monitor the metrics and take the appropriate action(s) when the threshold value(s) are reached.

For example, suppose that a maximum value is defined for the average time between barcode reads at some or all of the stations that implement the workflow process. The process management servers 25*a-b* may then monitor that metric in connection with each of the stations for which this maximum value applies. When the metric exceeds the defined maximum value for a particular device located at a particular station, the process management servers 25a-b may take an appropriate action, such as shutting down the particular device (e.g., so that no additional barcode reads will be accepted) until a manager has an opportunity to visit the station and identify the problem.

Figure 13:
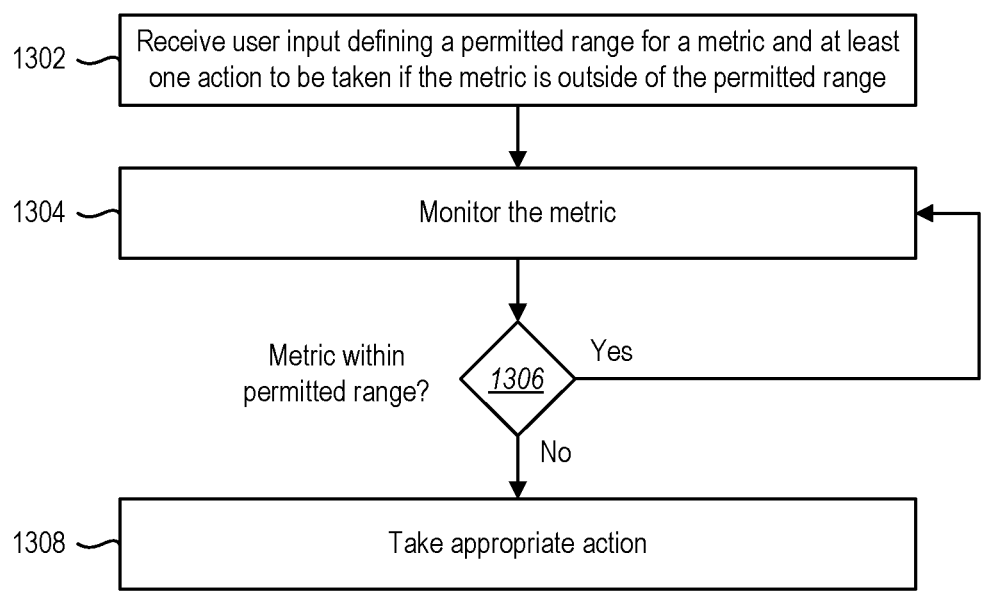
FIG. 13 illustrates an example of a method that may be implemented by a process management server.

FIG. 13 illustrates an example of a method 1300 that may be implemented by a process management server (e.g., either of the process management servers 25a-b in the system 10 of FIG. 1). In step 1302 of the method 1300, user input may be received defining a permitted range for a metric that is determined in connection with the workflow process. In some embodiments, defining the permitted range may include defining a maximum value that the metric should not exceed. Alternatively, or additionally, defining the permitted range may include defining a minimum value below which the metric should not fall.

In step 1304 of the method 1300, the process management server monitors the metric. In step 1306, the process management server determines whether the metric is within the permitted range that has been defined. For example, if the permitted range has been defined in terms of a maximum value, the process management server may determine whether the value of the metric is less than or equal to the maximum value. Alternatively, if the permitted range has been defined in terms of a minimum value, the process management server may determine whether the value of the metric is greater than or equal to the minimum value.

If the process management server determines that the value of the metric has fallen outside of the permitted range, then in step 1308 the process management server performs the action(s) that were previously defined (in step 1302) in connection with the metric. In some embodiments, the action(s) may include deactivating one or more devices at one or more stations. For example, if the average time between barcode reads at a particular station exceeds a defined maximum value, then the process management server may deactivate the device at that station so that no additional barcode reads will be accepted. The device may remain in a deactivated condition until a manager has an opportunity to visit the station and identify what is causing the problem.

An organization may use barcode readers for a variety of purposes. Because barcode readers may access and send information over a local area network (LAN) operated by the organization, the organization may want to control access to the barcode readers. The organization may include employees who are authorized to use the barcode readers (or a subset of the barcode readers) and employees who are not authorized to use the barcode readers. Because controlling physical access to the barcode readers may be burdensome and inefficient, the organization may want instead to restrict access to one or more functions of the barcode readers (such as barcode reading, barcode decoding, or transmitting decoded data) to prevent misuse of unattended barcode readers.

The barcode readers may require authentication before allowing access to barcode-reading functionality. The organization may selectively determine who within the organization can access a barcode reader. By default, barcode-reading functionality of the barcode reader may be unavailable. To unlock the barcode-reading functionality the barcode reader may require that a user provide authenticating information. The authenticating information may validate that the user is authorized to use the barcode-reading functionality of the barcode reader.

One way users may provide authenticating information is through use of identification cards with embedded near field communication (NFC) tags. Many organizations (such as hospitals) may provide identification cards to employees that include embedded NFC tags. When read, the embedded NFC tags may produce a code that identifies the user to whom the organization issued the identification card. Unlocking the barcode-reading functionality of the barcode reader may require that the user present the identification card to an NFC reader. The NFC reader reads the code and provides it to an authentication system. The authentication system validates that the code is associated with a user who is authorized to use the barcode reader. In this way, users may validate that they are authorized to use the barcode reader without having to memorize passwords or carry additional identification information.

The NFC reader may be included in a charger associated with the barcode reader, the barcode reader, a host computer, or a portable device (such as a USB drive connected to the host computer). The charger, the barcode reader, the host computer, or the portable device may include the authentication system and information identifying users who are authorized to use the barcode reader. In the alternative, the charger, the barcode reader, the host computer, or the portable device may communicate with a server that includes the information identifying users who are authorized to use the barcode reader.

A user may forget to return the barcode reader to a default state of the barcode reader after use. If the barcode reader is left unattended, an unauthorized user may obtain access to the barcode reader without having to validate the unauthorized user's identity. To reduce the likelihood that an unauthorized user gains access to the barcode reader the barcode reader may disable the barcode-reading functionality of the barcode reader after a preset period of time has passed since a last barcode scan. Disabling the barcode-reading functionality of the barcode reader may include disabling all functionality of the barcode reader. In the alternative, it may include disabling an ability of the barcode reader to transmit data wirelessly. The barcode reader may transmit data using a point-to-point connection or through a wireless LAN connection.

Beyond restricting access to barcode-reading functionality, the organization may want to restrict use of particular barcode readers to a defined physical area. For example, the organization may be a hospital that has several different units. The hospital may want to restrict use of certain barcode readers to a first unit and not allow use of the barcode readers in a second unit. To restrict use of the certain barcode readers to the first unit the hospital may include a server that determines whether a barcode reader is authorized to connect to a LAN at a particular location. The server may receive a request from the barcode reader to connect to the LAN. The request may include information identifying the device. The server may also receive location information. The location information may indicate a location within the LAN from which the device sent the request. The location may be a particular portion of the LAN. The server may refer to a list of barcode readers that can access the LAN from the location. If the device is authorized to access the LAN from the location, the server may send a response granting the device access to the LAN. If the device is not authorized to access the LAN from the location, the server may deny the device access to the LAN or reject any transmissions of decoded data from the barcode reader. In that case, the barcode reader may indicate a connection error to the user.

By controlling access to barcode-reading functionality of barcode readers and restricting use of the barcode readers to defined areas, the organization may reduce misuse of the barcode readers and improve productivity.

Figure 14:
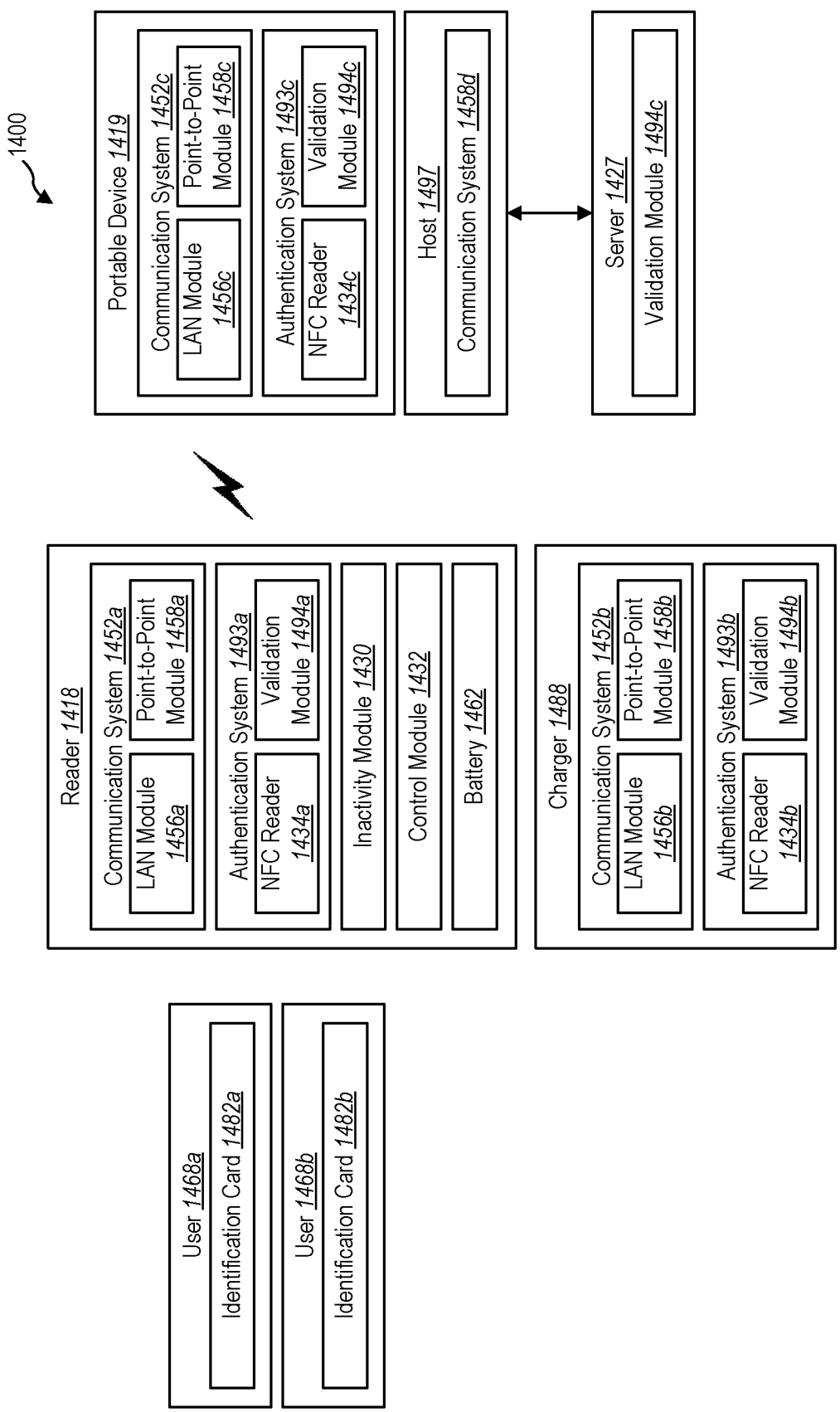
FIG. 14 illustrates an example system for controlling access to barcode-reading functionality of a device.

FIG. 14 illustrates an example system 1400 for controlling use of a device with barcode-reading capability. The system 1400 may include a reader 1418, a charger 1488, a host 1497, a portable device 1419, and a server 1427.

The reader 1418 may be any device or system with barcode-reading capabilities. Barcode-reading capabilities may include the capability to capture an image of a barcode and generate decoded data. A user may use the reader 1418 to capture and decode barcodes. The reader 1418 may be any of the process management input devices 18a-18c or include one or more of the features or functionalities of the process management input devices 18a-18c shown in FIG. 1. The reader 1418 represents one possible implementation of the process management input devices 18a-18c shown in FIG. 1. The reader 1418 may be the mobile device 18 or include one or more of the features or functionalities of the mobile device 18 shown in FIG. 2. The reader 1418 represents one possible implementation of the mobile device 18 shown in FIG. 2. The reader 1418 may be the smart barcode reader 18a or include one or more of the features or functionalities of the smart barcode reader 18a shown in FIG. 3. The reader 1418 represents one possible implementation of the smart barcode reader 18a shown in FIG. 3. The reader 1418 may be a combination of the reader 28 and the smart wedge 18b shown in FIG. 1 and FIG. 4A. The reader 1418 represents one possible implementation of the reader 28 and the smart wedge 18b shown in FIG. 1 and FIG. 4A.

The reader 1418 may include a communication system 1452a, an inactivity module 1430, a control module 1432, a battery 1462, and an authentication system 1493a.

The communication system 1452a may communicate with other devices and systems. The communication system 1452a may communicate with other devices and systems wirelessly or through a wired connection. The communication system 1452a may be the wireless communication system 52 or include any of the features or functionalities of the wireless communication system 52.

The communication system 1452a may include a LAN module 1456a. The LAN module 1456a may communicate wirelessly with one or more other devices through a LAN. The LAN module 1456a may be the wireless interface 108a or include any of the features or functionalities of the wireless interface 108a. The LAN module may be the LAN communications module 56 or include any of the features or functionalities of the LAN communications module 56.

The communication system 1452a may include a point-to-point module 1458a. The point-to-point module 1458a may wirelessly communicate directly with one or more other devices that include a point-to-point module. For example, the host 1497 may include a communication system 1458d that supports point-to-point communication. The reader 1418 may communicate with the host 1497 using the point-to-point module 1458a. The host 1497 may be connected to the LAN, either through a wired or wireless connection. The host 1497 may send information received from the reader 1418 through the LAN. The point-to-point module 1458a may be the point-to-point interface 108b or include any of the features or functionalities of the point-to-point interface 108b. The point-to-point module 1458a may be the wireless point-to-point communication interface 58 or include any of the features or functionalities of the point-to-point interface 108b.

The inactivity module 1430 may track an amount of time since a trigger event. The inactivity module 1430 may communicate the amount of time since the trigger event to the control module 1432. The inactivity module 1430 may include a counter. The counter may begin counting from zero at each trigger event. The counter may reset to zero each time a trigger event occurs. The inactivity module 1430 may include a maximum time value and may inform the control module 1432 when the counter reaches the maximum time value. In the alternative, at each trigger event, the counter may begin counting down from a preset period of time and reset to the present period of time when another trigger event occurs. The inactivity module 1430 may inform the control module 1432 when the counter reaches a zero value. The inactivity module 1430 may include multiple counters, maximum time values, and present periods of time. Each counter may be associated with a particular trigger event or category of trigger events.

The trigger event may be a barcode scan performed by the reader 1418. For example, assume the reader 1418 scans a first barcode. The counter may begin counting up from zero. Assume that 35 seconds passes. At that time, the counter may be at 35 seconds. Upon scanning a second barcode, the counter may reset to zero (from 35 seconds) and begin counting again until the reader 1418 scans another barcode. In the alternative, the counter may begin counting down from a preset period of time when the reader 1418 scans a first barcode. For example, assume the preset period of time is one minute. Assume it has been 20 seconds since scanning the first barcode. At that time, the counter may be at 40 seconds. If the reader 1418 scans a second barcode, the counter may reset to one minute and begin counting down again.

The trigger event may be receipt of authentication information. The authentication system 1493a may generate authentication information. The reader 1418 may receive authentication information from another source. The reader 1418 or one or more functions of the reader may be disabled until the reader 1418 receives authentication information. The counter may begin counting up from zero upon the reader 1418 receiving the authentication information. In the alternative, the counter may begin counting down from a preset period of time upon the reader 1418 receiving the authentication information.

A counter may respond to more than one type of trigger event. For example, the counter may respond to a barcode being scanned by the reader 1418 and to the reader 1418 receiving authentication information. In that case, the counter may reset when the reader 1418 scans a barcode or when the reader 1418 receives authentication information.

The control module 1432 may control availability of one or more functions of the reader 1418. For example, the control module 1432 may enable and disable the reader 1418. As another example, the control module 1432 may enable and disable barcode-reading functionality (such as decoding functionality) of the reader 1418. As another example, the control module 1432 may enable and disable the communication system 1452a or one or more functions of the communication system 1452a. The control module 1432 may enable and disable the communication system 1452a from connecting to a LAN, connecting to another device (such as through point-to-point communication), or sending decoded data generated from barcodes read by the reader 1418. For example, the control module may enable and disable the communication system 1452a from communicating with the host 1497, the charger 1488, or the portable device 1419.

The control module 1432 may determine whether to disable one or more functions of the reader 1418 based on information received from the inactivity module 1430. The control module 1432 may disable the reader 1418 based on information received from the inactivity module 1430. The control module 1432 may disable the communication system 1452a from connecting to a LAN, connecting to another device (such as through point-to-point communication), or sending decoded data generated from barcodes read by the reader 1418 based on information received from the inactivity module 1430. For example, the control module 1432 may disable the reader 1418 or one or more functions of the reader 1418 if the amount of time since the last barcode scan reaches a preset period. If the present period is one minute, the control module 1432 may disable the reader 1418 or one or more functions of the reader 1418 if the inactivity module 1430 determines that one minute has passed since the last barcode scan. Disabling the reader 1418 or one or more functions of the reader 1418 based on information received from the inactivity module 1430 may help protect the reader 1418 from unauthorized use.

The battery 1462 may provide power to the reader 1418. The battery 62 may be rechargeable. The battery 1462 may receive power from an external power source and provide operating power to the various components of the reader 1418. The battery 1462 may receive power from the charger 1488.

The charger 1488 may be used to charge the battery 1462. The charger 1488 may be associated with a particular reader, such as the reader 1418. The association may be permanent or temporary. For example, the charger 1488 may be temporarily associated to the reader 1418 through a point-to-point communication pairing (such as through a Bluetooth connection). The charger 1488 may be a docking station. The charger 1488 and the reader 1418 may be designed to connect to each other and enable the reader 1418 to be mounted on the charger 1488 such that the reader 1418 does not rotate. The charger 1488 may be a docking station of the type described in U.S. patent application Ser. No. 16/218,235.

The charger 1488 may be connected to the host 1497. The host 1497 may be a computing device from which the charger 1488 can draw power. The host 1497 may be a host computer, such as a desktop computer or a laptop computer. The host 1497 may include the features and functionalities of the host computer 97 or host 1597 describes later in this disclosure. The charger 1488 may provide information to the host 1497. The host 1497 may include a communication system 1458d. The communication system 1458d may allow the host 1497 to communicate with other devices. The communication system 1458d may allow the host 1497 to communicate with other devices or a LAN wirelessly or through a wired connection. For example, the charger 1488 may be connected to the host 1497 through a USB connection. The charger 1488 may provide data to the host 1497 through the USB connection. As another example, the charger 1488 may communicate with the host 1497 through point-to-point wireless communication, such as Bluetooth.

The charger 1488 may include authentication system 1493b. The authentication system 1493b may determine whether a user is authorized to use the reader 1418 or one or more functions of the reader 1418. The authentication system 1493b may receive authenticating information from the user to determine whether the user is authorized to use the reader 1418. The authentication system 1493b may use one or more methods for receiving authenticating information from the user. For example, the charger 1488 may include a pin pad that a user may use to enter a code. The charger 1488 may determine whether a user is authorized to use the reader 1418 if the user enters a valid code. The charger 1488 may determine that the user is not authorized to use the reader 1418 if the user does not enter a valid code. In the alternative, the charger 1488 may include a fingerprint scanner. The charger 1488 may determine whether a user is authorized to use the reader 1418 if the authentication system 1493b validates a fingerprint of the user.

The authentication system 1493b may use an NFC reader 1434b to receive authenticating information from a user. The NFC reader 1434b may read NFC tags. An NFC tag may be embedded in an identification card of a user, such as identification card 1482a of user 1468a. The NFC tag may produce a code when the NFC reader 1434b reads the NFC tag. The code may uniquely identify the user associated with the identification card.

The authentication system 1493b may determine whether a user (such as the user 1468a) associated with an identification card (such as the identification card 1482a) is authorized to access the reader 1418. The authentication system 1493b may determine whether the user is authorized to access the reader 1418 by determining whether the code provided by the identification card is valid for the reader 1418. Validation module 1494b may determine whether the code is valid. A valid code may be a code connected to a user who is authorized to use the reader 1418. If the code is valid, the authentication system 1493b may determine that the user is authorized to use the reader 1418. In the alternative, the charger 1488 may provide the code to server 1427. The server 1427 may use validation module 1494c to validate the code. If the validation module 1494c validates the code, the authentication system 1493b may determine that the user is authorized to use the reader 1418. The server 1427 shown in FIG. 14 may be the hardware server 27 or the hardware server 29 shown in FIG. 1 or include one or more of the features or functionalities of the hardware server 27 or the hardware server 29 shown in FIG. 1. For example, the server 1427 shown in FIG. 14 may include or represent one possible implementation of a workflow server (such as the workflow server 23a or the remote workflow server 23b), a process management server (such as the local process management server 25a or the remote process management server 25b), a license server (such as the local license server 21a or the remote license server 21b), or a data aggregation server (such as the local data aggregation server 33a or the remote data aggregation server 33b) shown in FIG. 1.

If the authentication system 1493b determines that the user 1468a is authorized to use the reader 1418, the authentication system 1493b may provide authentication information to the reader 1418. The authentication information may indicate that the user 1468a is authorized to use the reader 1418. The authentication information may indicate one or more functions of the reader 1418 that the user 1468a is authorized to use. The authentication information may provide information identifying the user 1468a.

The charger may include communication system 1452b. The communication system 1452b may allow the charger 1488 to communicate with other devices and systems. The communication system 1452b may allow the charger 1488 to communicate wirelessly with other devices and systems, such as the reader 1418. The communication system 1452b may be the wireless communication system 52 or include one or more features or functionalities of the wireless communication system 52. The charger 1488 may use the communication system 1452b to provide the authentication information to the reader 1418.

The communication system 1452b may include a LAN module 1456b. The LAN module 1456b may allow the charger 1488 to communicate wirelessly with one or more other devices through a LAN. The LAN module 1456b may be the wireless interface 108a or include one or more features or functionalities of the wireless interface 108a. The LAN module may be the LAN communications module 56 or include one or more features or functionalities of the LAN communications module 56.

The communication system 1452b may include a point-to-point module 1458b. The point-to-point module 1458b may allow the charger 1488 to wirelessly communicate directly with one or more other devices, such as the reader 1418. The point-to-point module 1458b may be the point-to-point interface 108b or include one or more features or functionalities of the point-to-point interface 108b. The point-to-point module 1458b may be the wireless point-to-point communication interface 58 or include one or more features or functionalities of the wireless point-to-point communication interface 58.

The users 1468a, 1468b may be persons capable of operating the reader 1418. The users 1468a, 1468b may be employees of an organization. For example, the users 1468a, 1468b may be employees of a hospital. Even where the users 1468a, 1468b are both employees of the organization, the users 1468a, 1468b may have different roles and responsibilities at the organization. The differences in roles and responsibilities of the users 1468a, 1468b may prompt the organization to provide the user 1468a access to certain equipment (such as the reader 1418) while restricting the user 1468b from accessing the certain equipment.

To facilitate controlling the equipment that the users 1468a, 1468b may access the users may receive identification cards 1482a, 1482b. The identification card 1482a may be associated with the user 1468a, and the identification card 1482b may be associated with the user 1468b. The identification card 1482a may be issued specifically to the user 1468a and may be intended for use by only the user 1468a. The identification card 1482a may include information indicating that the identification card 1482a belongs to the user 1468a and not any other users. In this way, the identification card 1482a may include information that allows the user 1468a to authenticate an identity of the user 1468a. For example, the identification card 1482a may have an embedded NFC tag unique to the identification card 1482a. The embedded NFC tag may generate one or more codes uniquely associated with the user 1468a.

Similarly, the identification card 1482b may be issued specifically to the user 1468b and may be intended for use only by the user 1468b. The identification card 1482b may include information uniquely associated with the user 1468b. In other words, the identification card 1482b may include information that allows the user 1468b to authenticate an identity of the user 1468b. For example, the identification card 1482b may have an embedded NFC tag unique to the identification card 1482b. The embedded NFC tag may generate one or more codes uniquely associated with the user 1468b.

The user 1468a may use the identification card 1482a to access the reader 1418 or one or more functions of the reader 1418. The identification card 1482a may allow the user 1468a to validate an identity of the user 1468a with the authentication system 1493b. The authentication system 1493b may determine whether the user 1468a is authorized to operate the reader 1418 or one or more functions of the reader 1418. Consider the following example. The reader 1418 or one or more functions of the reader 1418 are disabled and not usable. The identification card 1482a includes an NFC tag that uniquely identifies the user 1468a. The validation module 1494a includes information identifying the user 1468a as authorized to use the reader 1418. The user 1468a places the identification card 1482a within a reading range of the NFC reader 1434b. The NFC reader 1434b reads the NFC tag in the identification card 1482a. The NFC reader 1434b receives a code from the NFC tag. The validation module 1494a validates the code. The validation module 1494a generates authentication information indicating that the user 1468a is authorized to use the reader 1418. The communication system 1452b provides the authentication information to the reader 1418. The control module 1432 enables the reader 1418 or one or more functions of the reader 1418 based on the authentication information. The user 1468a may now use the reader 1418 or one or more functions of the reader 1418. For example, it may be that until the reader 1418 receives the authentication information, the control module 1432 does not allow use of the communication system 1452a. Once the reader 1418 receives the authentication information, the user 1468a may be able to use the communication system 1452a of the reader 1418 to transmit data to the charger 1488, the host 1497, the portable device 1419, or the LAN.

As another example, assume the user 1468b is not authorized to use the reader 1418. The reader 1418 or one or more functions of the reader 1418 are disabled and not usable. The identification card 1482b includes an NFC tag that uniquely identifies the user 1468b. The validation module 1494a does not include information identifying the user 1468b as authorized to use the reader 1418. The user 1468b places the identification card 1482b within a reading range of the NFC reader 1434b. The NFC reader 1434b reads the NFC tag in the identification card 1482b. The NFC reader 1434b receives a code from the NFC tag. The validation module 1494a does not validate the code and determines that the user 1468b is not authorized to use the reader 1418. The validation module 1494a does not generate authentication information for the user 1468b. The reader 1418 or one or more functions of the reader 1418 remain disabled and not usable. Even though the user 1468b may be able to physically control the reader 1418, the user 1468b cannot use the reader 1418 or one or more functions of the reader 1418. In this way, the user 1468b may be restricted from misusing the reader 1418 without being denying physical access to the reader 1418.

The functionality of the authentication system 1493b described above may be performed and embodied in the authentication system 1493a of the reader 1418. The authentication system 1493a may include NFC reader 1434a and validation module 1494a. The NFC reader 1434a may have the functionality of the NFC reader 1434b, and the validation module 1494a may have the functionality of the validation module 1494b.

The functionality of the authentication system 1493b may also be performed and embodied in a portable device 1419. The portable device 1419 may include authentication system 1493c, NFC reader 1434c, validation module 1494c, communication system 1452c, LAN module 1456c, and point-to-point module 1458c. The portable device 1419 may be a small device (such as a USB stick) designed to be inserted into another device, such as the charger 1488, the reader 1418, the server 1427, or the host 1497. For example, the portable device 1419 may be inserted into the host 1497. The host 1497 may be connected to a LAN (either wirelessly or through a wired connection). The reader 1418 may require a connection to the portable device 1419 to send decoded data through the LAN (via the host 1497). The reader 1418 may connect to the portable device 1419 using point-to-point communication, such as Bluetooth communication. The reader 1418 may not allow transmission of decoded data to the portable device 1419 unless the reader 1418 receives authentication information from the portable device 1419.

The functionality of the authentication system 1493*b* may also be performed and embodied in the host 1497.

Figure 15:
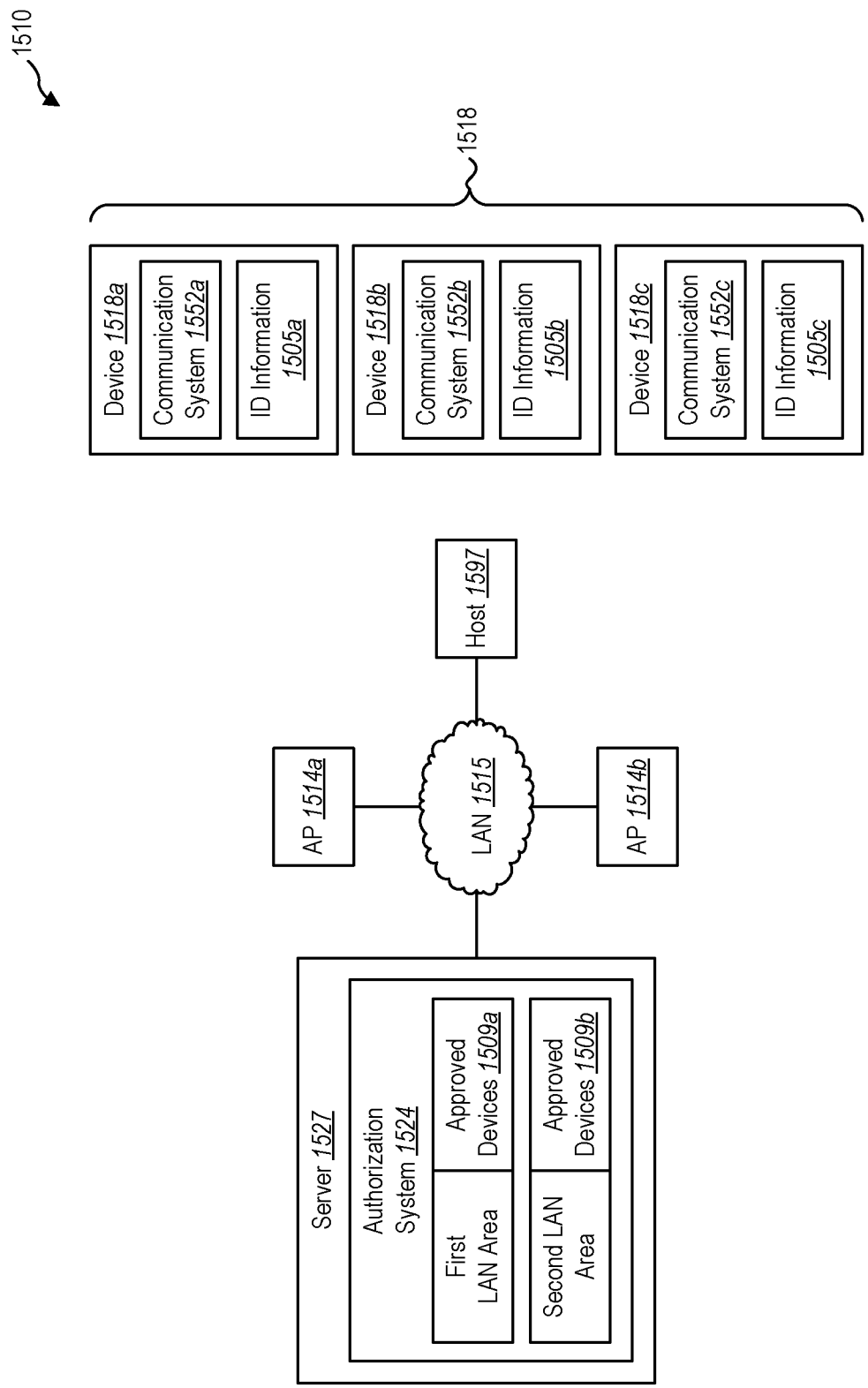
FIG. 15 illustrates an example system for controlling access to a local area network and a server.

FIG. 15 illustrates an example system 1510 for restricting use of devices with barcode-reading capabilities. The system 1510 may include devices 1518, server 1527, LAN 1515, access point 1514*a*, access point 1514*b*, and host 1597. The LAN 1515 may have any of the features or functionalities of the LAN 15 shown in FIG. 1. The system 1510 may include any of the elements, features, and functionalities of the system 10 shown in FIG. 1.

The devices 1518 may be any devices or systems that have barcode-reading capabilities, such as the reader 1418. The devices 1518 may include identification information 1505*a*, 1505*b*, 1505*c* that uniquely identifies each device. For example, the identification information 1505*a* may uniquely identify device 1518*a*, the identification information 1505*b* may uniquely identify device 1518*b*, and the identification information 1505*c* may uniquely identify device 1518*c*.

The devices 1518 may include communication systems 1552*a*, 1552*b*, 1552*c* that allow the devices 1518 to communicate with other devices and systems. The communication systems 1552*a*, 1552*b*, 1552*c* may include the features and functionality of the communication system 1452*a*. The communication systems 1552*a*, 1552*b*, 1552*c* may facilitate the devices 1518 connecting to the LAN 1515.

The devices 1518 may need approval to connect to the LAN 1515. The devices 1518 may make connection requests to connect to the LAN 1515. The LAN 1515 may allow multiple devices to exchange information wirelessly and through wired connections. A connection request to connect to the LAN 1515 may be a request to be able to use the LAN 1515 to exchange information with one or more other devices connected to the LAN 1515. A connection request may include information used to determine whether to grant or deny a device access to the LAN 1515. The connection request may include information sufficient to identify the device. For example, a connection request from the device 1518*a* may include the identification information 1505*a*. The connection request may include location information. The location information may indicate a location of the device. For example, the location information may be GPS coordinates. The location may be a location within the LAN 1515. The location information may indicate a location within the LAN 1515 from which the device sent the connection request. For example, the location may be a host computer connected to the LAN 1515 through which the device sent the connection request. The location may be a particular portion of the LAN 1515. For example, the location may be an area covered by a particular access point of the LAN 1515.

The server 1527 may be a hardware server. The server 1527 may include an authorization system 1524 that controls access to the LAN 1515 and to the server 1527. The server 1527 may communicate with devices 1518 through the LAN 1515. The server 1527 may receive connection requests from the devices 1518. The server 1527 may receive decoded data from the devices 1518. The server 1527 may have any of the features or functionalities of the hardware server 27 or the hardware server 29 shown in FIG. 1. For example, the server 1527 may include or represent one possible implementation of a workflow server (such as the local workflow server 23*a* or the remote workflow serer 23*b*), a process management server (such as the local process management server 25*a* or the remote process management server 25*b*), a license server (such as the local license server 21*a* or the remote license server 21*b*), or a data aggregation server (such as the local data aggregations server 33*a* or the remote data aggregation server 33*b*).

The LAN 1515 may be accessible from a particular geographical area. For example, the LAN 1515 may cover a hospital and be accessible from within the hospital. The LAN 1515 may include two or more portions. The two or more portions may correspond to two or more physical areas. For example, the hospital may include two or more units (such as an intensive care unit and a maternity ward). Each unit of the hospital may be a portion of the LAN 1515. As an alternative example, the hospital may use wireless access points to make the LAN 1515 accessible. A first portion of the LAN 1515 may be a first area covered by a first access point. A second portion of the LAN 1515 may be a second area covered by a second access point. The two or more portions may be distinct. Alternatively, the two or more portions may have some overlap.

When a device tries to connect to the LAN 1515, the LAN 1515 may receive location information associated with the device. The location information may indicate from which portion of the LAN 1515 the device sent a connection request. For example, a device may send a connection request while operating in the intensive care unit of the hospital. When the device sends the connection request, the LAN 1515 may receive information indicating that the device sent the connection request from the intensive care unit.

The LAN 1515 may include access points, such as access point 1514*a* and access point 1514*b*. The devices 1518 may use the communication systems 1552*a*, 1552*b*, 1552*c* to connect to the LAN 1515 and thereby communicate with the server 1527. The devices 1518 may connect to the LAN 1515 through one of the access points 1514*a*, 1514*b*. The access points 1514*a*, 1514*b* may be wireless access points. In the alternative, the access points 1514*a*, 1514*b* may be wired access points. The devices 1518 may connect to the LAN 1515 through the host 1597. The devices 1518 may connect to the LAN 1515 wirelessly or through a wired connection.

The access points 1514*a*, 1514*b* may have different physical locations. For example, the LAN 1515 may cover a large hospital that includes multiple units. The access point 1514*a* may be located in a first unit (such as an intensive care unit) while the access point 1514*b* may be located in a second unit (such as a maternity ward). The access point 1514*a* may provide access to the LAN 1515 to devices operating in the first unit. Other access points may also provide access to the LAN 1515 to devices operating in the first unit. The access point 1514*b* may provide access to the LAN 1515 to devices operating in the second unit. Other access points may also provide access to the LAN 1515 to devices operating in the second unit. When a device sends a connection request through an access point, the access point may provide information to the LAN 1515 indicating that the device is trying to access the LAN 1515 through the access point. For example, if device 1518*a* tries to connect to the LAN 1515 using the access point 1514*a*, the access point 1514*a* may indicate to the LAN 1515 that the device 1518*a* is using the access point 1514a to try and connect to the LAN 1515. The access point 1514a may provide information indicating a location of the access point 15414a.

The host 1597 may have a physical location. The physical location of the host 1597 may be near an access point or far from access points. The host 1597 may connect to the LAN 1515 through a wired connection or a wireless connection. The host 1597 may communicate with the devices 1518 using a wireless connection or a wired connection. For example, the host 1597 may communicate with the devices 1518 using point-to-point communication or through a USB connection. When a device tries to access the LAN 1515 through the host 1597, the host 1597 may provide information to the LAN 1515 indicating that the device is trying to access the LAN 1515 through the host 1597. The host 1597 may include the features or functionalities of the host computer 97 or the host 1497.

The authorization system 1524 of the server 1527 may, in response to a connection request, determine whether a device is authorized to connect to the LAN 1515 or the server 1527. The authorization system 1524 may determine whether the device is authorized to connect to the LAN 1515 or the server 1527 at a particular location (such as a location from which the device sent the connection request). The authorization system 1524 may determine whether the device is authorized for use in a particular portion of the LAN 1515 (such as in a portion of the LAN from which the device sent the connection request). The authorization system 1524 may grant or deny the device access to the LAN 1515 or the server 1527.

The authorization system 1524 may include information indicating devices that are authorized to connect to the LAN 1515. The authorization system 1524 may include information indicating devices that are authorized to connect to one or more portions of the LAN 1515. For example, a first LAN area may have an associated list 1509a of approved devices, and a second LAN area may have an associated list 1509b of approved devices. The authorization system 1524 may include information indicating locations associated with the one or more portions of the LAN 1515. The authorization system 1524, the associated list 1509a, and the associated list 1509b may be implemented in a workflow server (such as the workflow servers 23a-b shown in FIG. 1), a process management server (such as the process management servers 25a-b shown in FIG. 1), or a data aggregation server (such as the data aggregation servers 33a-b shown in FIG. 1).

The authorization system 1524 may determine whether a device is authorized to connect to the LAN 1515, the server 1527, or a particular portion of the LAN 1515 based on information received from the LAN 1515 when the device tries to connect to the LAN 1515. The authorization system 1524 may receive information identifying the device. The authorization system 1524 may receive information indicating a location of the device or a portion of the LAN 1515 from which the device is trying to connect to the LAN 1515. The authorization system 1524 may determine whether the device is authorized to connect to the LAN 1515, the server 1527, or to a particular portion of the LAN 1515 based on the information identifying the device and the information indicating the location of the device or the portion of the LAN 1515 from which the device is trying to connect to the LAN 1515. For example, the list 1509a may identify the device 1518c, and the list 1509b may identify the device 1518b but not the device 1518c. The authorization system 1524 may receive information identifying the device 1518c and indicating that the device 1518c sent a connection request from the second LAN area. The authorization system 1524 may determine that the device 1518c is not authorized to connect to the LAN 1515 or to the second LAN area because the list 1509b does not identify the device 1518c.

The authorization system 1524 may provide a response to a connection request. The response to the connection request may be based on whether the device is authorized to connect to the LAN 1515, the server 1527, or a particular portion of the LAN 1515. The response may grant a device access to the LAN 1515 when the device is authorized to connect to the LAN 1515 or the particular portion of the LAN 1515. The response may grant the device access to the server 1527 when the device is authorized to connect to the server 1527 or to connect to the server 1527 from the particular portion of the LAN 1515. If the response grants the device access to the LAN 1515, the device may connect to the LAN 1515. If the response grants the device access to the server 1527, the device may communicate with the server 1527. Granting access to the LAN 1515 may include granting access to the server 1527. After the device connects to the LAN 1515, the device may provide decoded data to the server 1527. The response may deny a device access to the LAN 1515 when the device is not authorized to connect to the LAN 1515 or the particular portion of the LAN 1515. If the response denies the device access to the LAN 1515, the device may not be able to connect to the LAN 1515 or send decoded data to the server 1527.

Consider the following example. The device 1518a is authorized to connect to the LAN 1515 from a first portion of the LAN 1515 but is not authorized to connect to the LAN 1515 from a second portion of the LAN 1515. The access point 1514a covers the first portion of the LAN 1515, and the access point 1514b covers the second portion of the LAN 1515. The device 1518a first tries to connect to the LAN 1515 using the access point 1514b, sending a connection request through the access point 1514b. The connection request includes the identification information 1505a. The access point 1514b provides the server 1527 with the connection request, including the identification information 1505a, and indicates that the device 1518a is trying to connect to the LAN 1515 using the access point 1514b. The authorization system 1524 includes a list of approved devices for the second portion of the LAN 1515 (such as the list 1509b). The list does not include the device 1518a. Because the list of approved devices for the second portion of the LAN 1515 does not include the device 1518a, the authorization system 1524 determines that the device 1518a is not authorized to connect to the LAN 1515 from the second portion of the LAN 1515. The authorization system 1524 provides a response to the connection request that denies the device 1518a access to the LAN 1515. The device 1518a attempts to send the server 1527 decoded data but is unsuccessful. The device 1518a indicates to a user that a connection error has occurred.

After being denied access to the LAN 1515, the device 1518a sends a second connection request using the access point 1514a. The connection request includes the identification information 1505a. The access point 1514a provides the server 1527 with the connection request and indicates that the device 1518a is trying to connect to the LAN 1515 using the access point 1514a. The authorization system 1524 includes a list of approved devices for the first portion of the LAN 1515 (such as the list 1509a). The list includes the device 1518a. Because the list of approved devices for the first portion of the LAN 1515 includes the device 1518a, the authorization system 1524 determines that the device 1518a is authorized to connect to the LAN 1515 from the first portion of the LAN 1515. The authorization system 1524 provides a response to the connection request that grants the device 1518a access to the LAN 1515. The device 1518a connects to the LAN 1515. The device 1518a scans a barcode and provides decoded data to the server 1527 through the access point 1514a.

Figure 16:
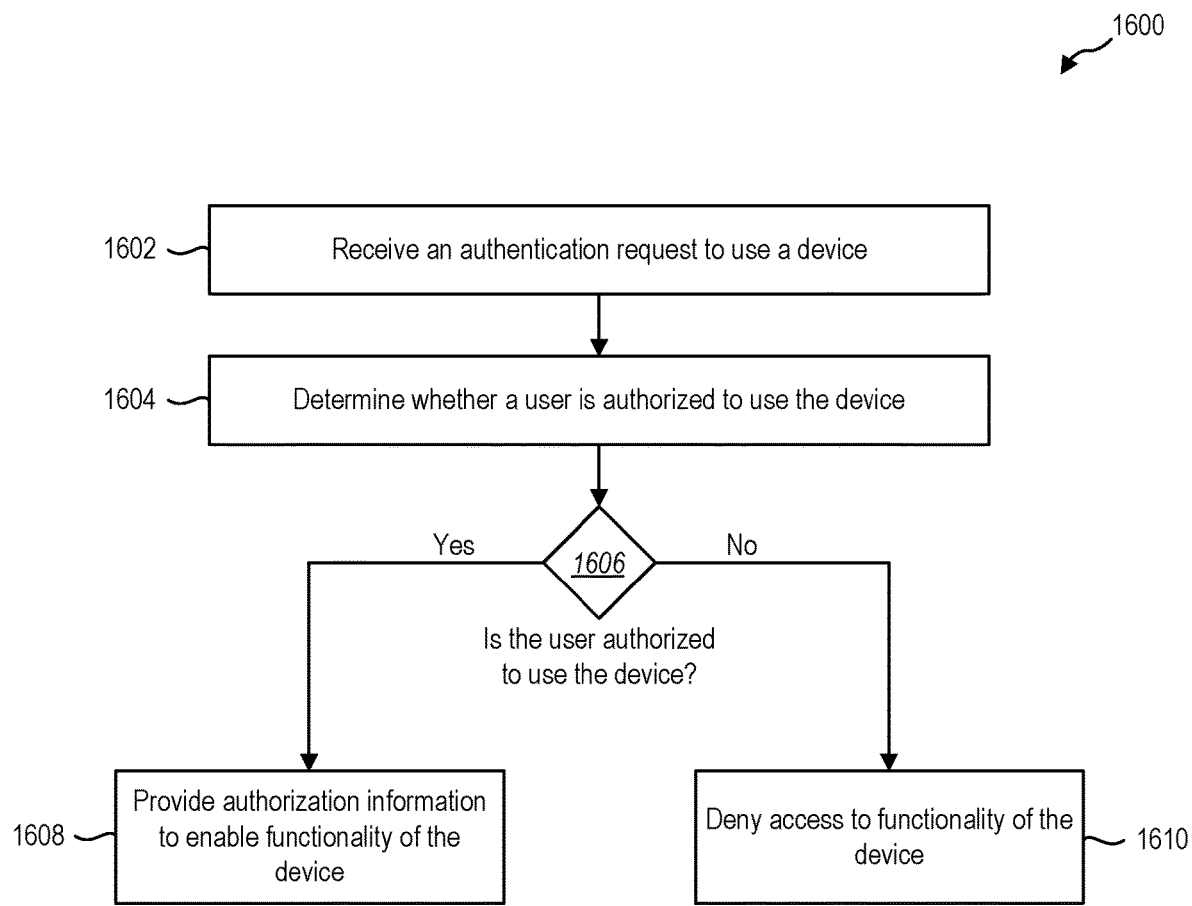
FIG. 16 illustrates an example method for controlling use of a device.

FIG. 16 illustrates an example method 1600 for controlling access to a device with barcode-reading capabilities.

The method 1600 may include receiving 1602 an authentication request to use a device. The device may have barcode-reading capabilities. One or more functionalities of the device may be disabled or not available to a user. For example, the user may not be able to capture images of barcodes, decode barcodes, or send decoded data using the device. The user may initiate the authentication request to enable the one or more functionalities of the device. The authentication request may include authenticating information. For example, the authenticating information may be a key code, a password, a fingerprint, or an eye scan. The authenticating information may also include a code from an NFC tag. For example, the user may make the authentication request using an identification card with an embedded NFC tag. The user may make the authentication request by placing the identification card within a reading distance of an NFC reader. The NFC reader may be included in a charger for the device, a portable device (such as a USB stick, which may be inserted in a host computer), the host computer, or the device. When the NFC reader reads the embedded NFC tag, the NFC reader may receive a code from the embedded NFC tag. The code may be uniquely associated with the identification card, which may be issued to a particular user.

The method 1600 may include determining 1604 whether a user is authorized to use the device. Determining 1604 whether the user is authorized to use the device may include validating the authenticating information. An authentication system may determine whether the user is authorized to use the device based on whether the authenticating information provided by the user is valid. The authentication system may determine that the user is authorized to use the device if the authenticating information is valid and determine that the user is not authorized to use the device if the authenticating information is not valid. For example, determining 1604 whether the user is authorized to use the device may include validating the code provided by the embedded NFC tag included in the identification card of the user. The code may be unique to the embedded NFC tag. The identification card that includes the embedded NFC tag may be assigned to the user. Only certain users may be authorized to use the device. The authentication system may include a list of users authorized to use the device. If the scanned identification card is associated with a user who is authorized to use the device, the authentication system may determine that the user is authorized to use the device. If the scanned identification card is associated with a user who is not authorized to use the device, the authentication system may determine that the user is not authorized to use the device. The authentication system may be included in the charger, the portable device, the host computer, or the device.

Based on whether 1606 the user is authorized to use the device, the method 1600 may include providing 1608 authentication information to enable functionality of the device or denying 1610 access to functionality of the device.

If the user is authorized to use the device, the method 1600 may include providing 1608 the authentication information. The authentication system may provide 1608 the authentication information to the device. The device may enable the one or more functionalities of the device upon receiving the authentication information. The authentication information may indicate that the user is authorized to use the device.

If the user is not authorized to use the device, the method 1600 may include denying 1610 access to the functionality of the device. The authentication system may communicate to the device that the user is not authorized to use the device. As a result, the device may continue to make the one or more functions unavailable to the user.

Figure 17:
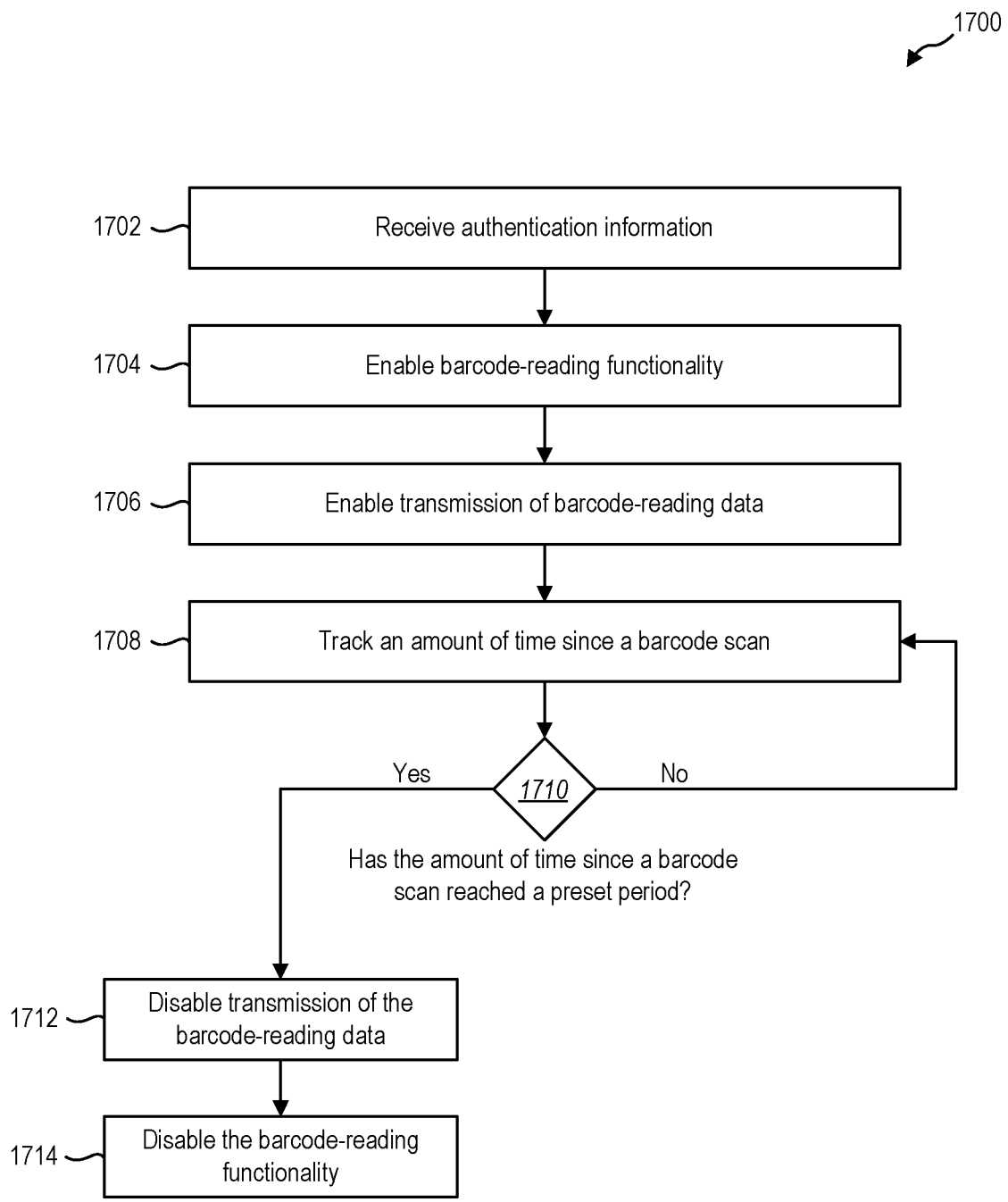
FIG. 17 illustrates an example method for automatically restricting access to barcode-reading functionality of a device.

FIG. 17 illustrates an example method 1700 for disabling use of barcode-reading functionality.

The method 1700 may include receiving 1702 authentication information. A device with barcode-reading functionality may receive the authentication information. The device may receive the authentication information from an authentication system. The authentication system may be included in the device, a charger for the device, a host computer, or a portable device inserted in the host computer. The authentication information may indicate that a user is authorized to use the device or barcode-reading functionality of the device.

The method 1700 may include enabling 1704 barcode-reading functionality. The device may enable the barcode-reading functionality after receiving the authentication information. The barcode-reading functionality may include capturing images of barcodes, decoding the barcodes, and producing decoded data based on the barcodes.

The method 1700 may include enabling 1706 transmission of barcode-reading data. The barcode-reading data may include decoded data. The device may include a communication system for transmitting the barcode-reading data. Enabling 1706 the transmission of the barcode-reading data may include enabling the communication system. The communication system may include a point-to-point communication interface. The point-to-point communication interface may communicate with a point-to-point communication interface of a host computer or a portable device inserted into the host computer. The point-to-point communication interface may provide decoded data. The host computer may provide the decoded data to a server. The communication system may include a LAN communication interface. The LAN communication interface may communicate with a LAN to provide decoded data to a server connected to the LAN.

The method 1700 may include tracking 1708 an amount of time since a barcode scan. The device may include an inactivity module to track 1708 the amount of time since a barcode scan.

The method 1700 may include determining 1710 whether the amount of time since a barcode scan has reached a preset period. The inactivity module may include a counter that begins counting down from the preset period after each barcode scan. The inactivity module may determine that the amount of time since a barcode scan has reached the preset period when the counter reaches zero. In the alternative, the inactivity module may include a counter that begins counting up from zero after each barcode scan. The inactivity module may determine that the amount of time since a barcode scan has reached the preset period when the counter reaches the preset period.

If the amount of time since a barcode scan has reached the preset period, the method 1700 may include disabling 1712 transmission of the barcode-reading data. Disabling 1712 the transmission of the barcode-reading data may include disabling the communication system. Disabling 1712 the transmission of the barcode-reading data may include disabling the communication system from sending barcode-reading data or disabling the device from providing barcode-reading data to the communication system.

If the amount of time since a barcode scan has reached the present period, the method 1700 may include disabling 1714 the barcode-reading functionality. Disabling 1714 the barcode-reading functionality may include disabling the device, disabling image capture functionality, or disabling decoding functionality. The device may not enable the barcode-reading functionality unless and until it receives authentication information.

Figure 18:
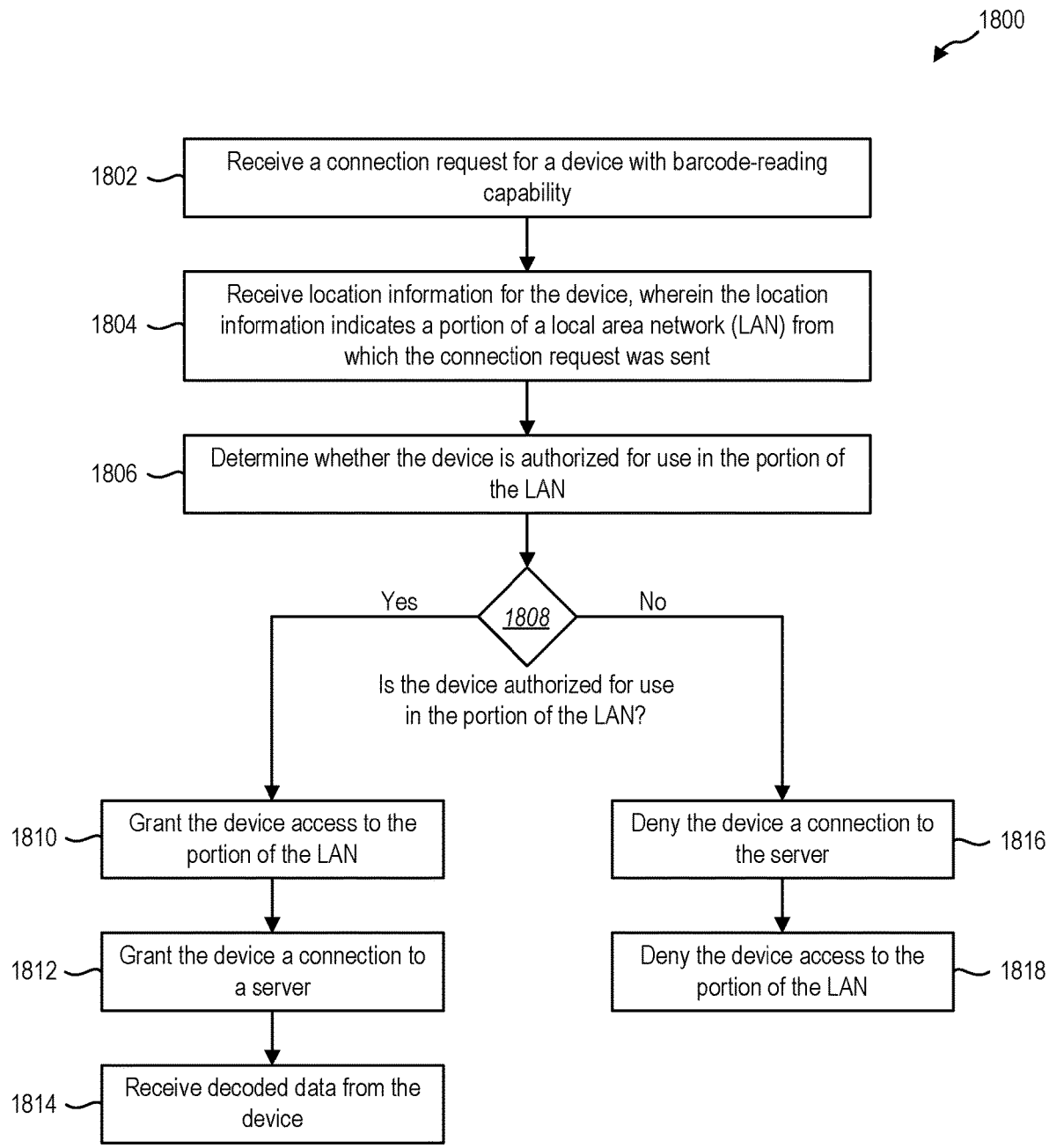
FIG. 18 illustrates an example method for limiting access to a local area network and a server.

FIG. 18 illustrates an example method 1800 for controlling access to a LAN network.

The method 1800 may include receiving 1802 a connection request for a device with barcode-reading capability. A server may receive 1802 the connection request from the device. The connection request may include information identifying the device. The connection request may include a request to connect to a LAN. The server may be connected to the LAN. The connection request may include a request to connect to or send data to the server.

The method 1800 may include receiving 1804 location information for the device, wherein the location information indicates a portion of a LAN from which the connection request was sent. The connection request may include the location information. The device may provide the location information. An access point of the LAN may provide the location information. A host computer connected to the LAN may provide the location information. The location information may indicate which of two or more access points the device used to send the connection request. The device may connect to an access point using a LAN module. The location information may indicate a particular host computer the device used to send the connection request. The device may connect to the host computer using a point-to-point module.

The method 1800 may include determining 1806 whether the device is authorized for use in the portion of the LAN. The server may determine 1806 whether the device is authorized for use in the portion of the LAN. The server may include information about what devices are authorized for use in each portion of the LAN. For example, for each portion of the LAN, the server may include an associated list that identifies devices that are authorized for use in that portion of the LAN.

The method 1800 may include granting or denying access to the LAN based on whether 1808 the device is authorized for use in the portion of the LAN.

If the device is authorized for use in the portion of the LAN, the method 1800 may include granting 1810 the device access to the portion of the LAN. The server may grant 1810 the device access to the portion of the LAN. The server may send a response to the connection request granting 1810 the device access to the portion of the LAN. The device may lose access to the LAN if the device tries to connect to the LAN from a different portion of the LAN.

If the device is authorized for use in the portion of the LAN, the method 1800 may include granting 1812 the device a connection to a server. Granting 1812 the device the connection to the server may allow the device to send decoded data to the server. The device may not be able to send the decoded data to the server unless the device is granted 1812 the connection to the server. In other words, even when the device has access to the LAN, the device may not be able to send the decoded data to the server without receiving the connection to the server. In the alternative, granting the device access to the portion of the LAN may include granting the device the connection to the server.

If the device is authorized for use in the portion of the LAN, the method 1800 may include receiving 1814 decoded data from the device. The device may capture an image of a barcode. The device may decode the barcode from the image and produce the decoded data. The server may receive 1814 the decoded data from the device.

If the device is not authorized for use in the portion of the LAN, the method 1800 may include denying 1816 the device a connection to the server. Denying 1816 the device the connection to the server may include the server rejecting decoded data sent from the device. The device may indicate a connection error if a user tries to send decoded data to the server.

If the device is not authorized for use in the portion of the LAN, the method 1800 may include denying 1818 the device access to the portion of the LAN. The device may indicate a connection error when the device is denied 1818 access to the portion of the LAN. The server may deny 1818 the device access to the portion of the LAN.

Figure 19:
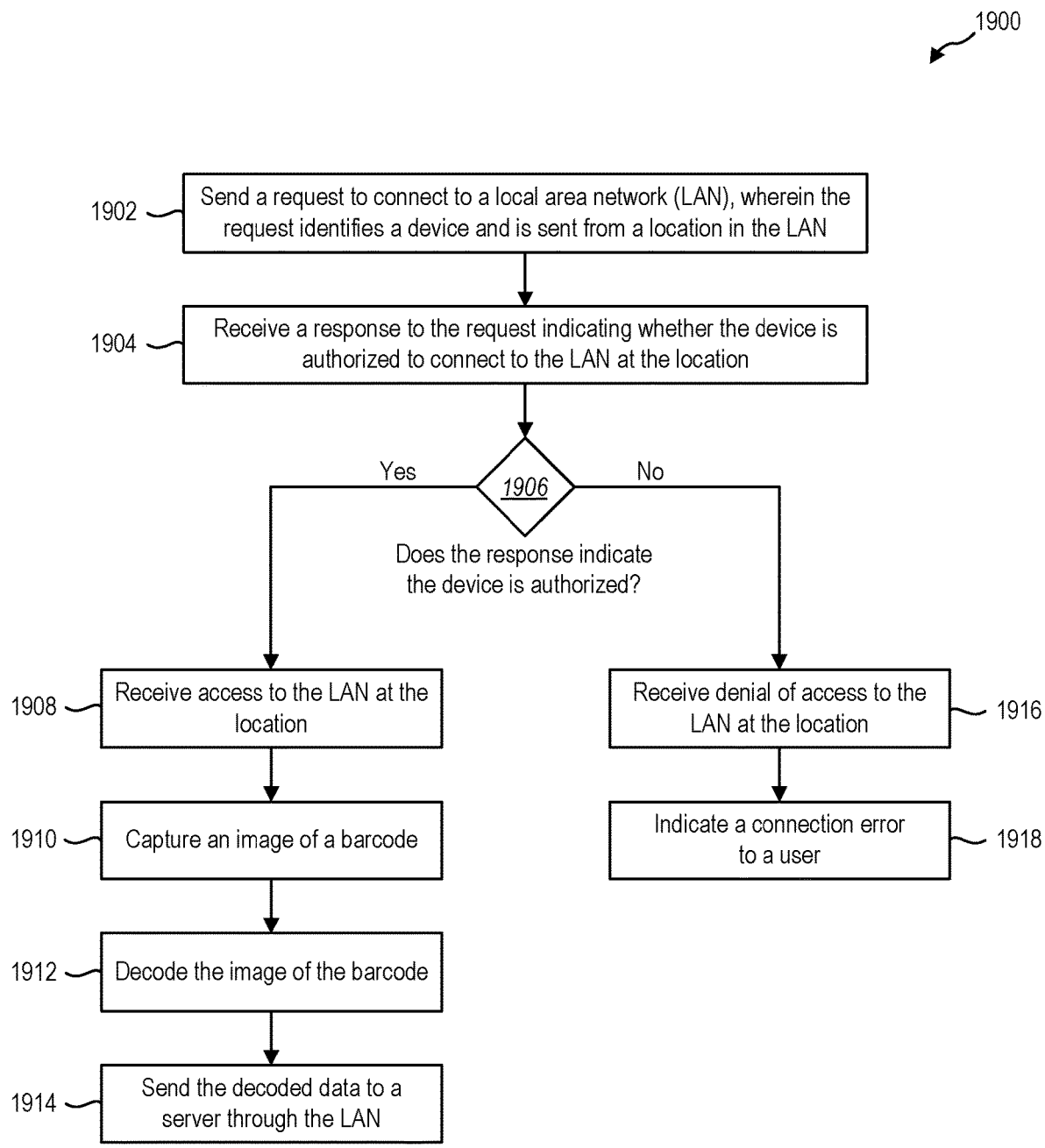
FIG. 19 illustrates an example method for requesting access to a local area network.

FIG. 19 illustrates an example method 1900 for connecting to a LAN.

The method 1900 may include sending 1902 a request to connect to a LAN, wherein the request identifies a device and is sent from a location in the LAN. The device may send the request. The device may send the request through an access point of the LAN. The device may send the request through a host computer connected to the LAN. The location may be a particular portion of the LAN.

The method 1900 may include receiving 1904 a response to the request indicating whether the device is authorized to connect to the LAN at the location. A server may send the response. The server may include information indicating what devices are authorized to connect to the LAN at the location.

The method 1900 may include determining 1906 whether the response indicates that the device is authorized.

If the device is authorized, the method 1900 may include receiving 1908 access to the LAN at the location. The server may grant the device access to the LAN at the location. Receiving 1908 access to the LAN at the location may allow the device to connect to the LAN at the location.

If the device is authorized, the method 1900 may include capturing 1910 an image of a barcode. The device may capture 1910 the image of the barcode.

If the device is authorized, the method 1900 may include decoding 1912 the image of the barcode. The device may decode 1912 the image of the barcode. Decoding 1912 the image of the barcode may include generating decoded data.

If the device is authorized, the method 1900 may include sending 1914 decoded data to a server through the LAN. The device may send 1914 the decoded data to the server through the LAN.

If the device is not authorized, the method 1900 may include receiving 1916 denial of access to the LAN at the location. The device may receive 1916 the denial of access to the LAN at the location. The device may receive 1916 the denial from the server.

If the device is not authorized, the method 1900 may include indicating 1918 a connection error to a user. The device may indicate 1918 the connection error to the user.

The techniques disclosed herein can be implemented in hardware, software, firmware, or any combination thereof, unless specifically described as being implemented in a specific manner. Any features described as modules, components, or the like can also be implemented together in an integrated logic device or separately as discrete but interoperable logic devices. If implemented in software, the techniques can be realized at least in part by a non-transitory computer-readable medium having computer-executable instructions stored thereon that, when executed by at least one processor, perform some or all of the steps, operations, actions, or other functionality disclosed herein. The instructions can be organized into routines, programs, objects, components, data structures, etc., which can perform particular tasks and/or implement particular data types, and which can be combined or distributed as desired in various embodiments.

The term "processor" can refer to a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, or the like. A processor can be a central processing unit (CPU). In some embodiments, a combination of processors (e.g., an ARM and DSP) could be used to implement some or all of the techniques disclosed herein.

The term "memory" can refer to any electronic component capable of storing electronic information. For example, memory may be embodied as random access memory (RAM), read-only memory (ROM), magnetic disk storage media, optical storage media, flash memory devices in RAM, on-board memory included with a processor, erasable programmable read-only memory (EPROM), electrically erasable programmable read-only memory (EEPROM) memory, registers, and so forth, including combinations thereof.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

The term "determining" (and grammatical variants thereof) can encompass a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there can be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A barcode-reading system comprising:
    a device having barcode-reading capability, the device comprising:
        a wireless communication system for transmitting barcode-reading data;
        an inactivity module that tracks an amount of time since a last barcode scan; and
        a control module that disables transmission of the barcode-reading data when the amount of time since the last barcode scan reaches a preset period and that enables transmission of the barcode-reading data in response to receiving authentication information; and
    a charger configured to couple to the device and provide power to the device, the charger comprising:
        an authentication system that determines whether a user is authorized to use the device; and
        a communication system that transmits the authentication information to the device when the authentication system determines that the user is authorized to use the device.

2. The barcode-reading system of claim 1, wherein the authentication system comprises a near field communication (NFC) reader.

3. The barcode-reading system of claim 2, wherein the authentication system determines whether the user is authorized to use the device by authenticating an NFC embedded identification card of the user.

4. The barcode-reading system of claim 1, wherein disabling the transmission of the barcode-reading data comprises disabling the wireless communication system from transmitting the barcode-reading data and enabling the transmission of the barcode-reading data in response to receiving the authentication information comprises enabling the wireless communication system to transmit the barcode-reading data.

5. The barcode-reading system of claim 1, wherein the authentication information identifies the user.

6. The barcode-reading system of claim 1, wherein the charger is a docking station.

7. A barcode-reading system comprising:
    a device comprising:
        a barcode reader;
        an inactivity module that tracks an amount of time since a last barcode read; and
        a control module that disables the barcode reader when the amount of time since the last barcode read reaches a preset period and that enables the barcode reader upon receipt of authentication information; and
    a charger configured to couple to the device and provide power to the device, the charger comprising:
        an authentication system that determines whether a user is authorized to use the device; and
        a communication system that transmits the authentication information to the device when the authentication system determines that the user is authorized to use the device.

8. The barcode-reading system of claim 7, wherein the authentication system comprises an NFC reader.

9. The barcode-reading system of claim 8, wherein the authentication system determines whether the user is authorized to use the device by authenticating an NFC embedded identification card of the user.

10. The barcode-reading system of claim 7, wherein the device comprises a wireless communication system for transmitting barcode-reading data and the wireless communication system comprises one or more of a local area network (LAN) communications module and a wireless point-to-point module.

11. The barcode-reading system of claim 7, wherein disabling the barcode reader comprises disabling barcode-reading functionality of the barcode reader.

12. The barcode-reading system of claim 11, wherein the barcode-reading functionality of the barcode reader comprises decoding functionality.

13. A system comprising:
one or more processors; and
memory comprising instructions that are executable by the one or more processors to cause the system to:
receive a first connection request for a device with barcode-reading capability, wherein the first connection request identifies the device; and comprises first location information identifying a first portion of a local area network (LAN) from which the first connection request was sent;
deny the first connection request in response to determining that the device is not authorized for use in the first portion of the LAN;
receive a second connection request for the device, wherein the second connection request identifies the device and comprises second location information identifying a second portion of the LAN from which the second connection request was sent; and
grant the second connection request in response to determining that the device is authorized for use in the second portion of the LAN.

14. The system of claim 13, wherein:
determining that the device is not authorized for use in the first portion of the LAN comprises determining that a first list of approved devices for the first portion of the LAN does not identify the device; and
determining that the device is authorized for use in the second portion of the LAN comprises determining that a second list of approved devices for the second portion of the LAN identifies the device.

15. The system of claim 13, wherein the instructions that are executable by the one or more processors further cause the system to:
receive decoded data from the device, wherein the decoded data corresponds to a barcode read by the device.

16. A device with barcode-reading capabilities, the device comprising:
a wireless communication system;
one or more processors; and
memory comprising instructions that are executable by the one or more processors to cause the device to:
send, through the wireless communication system, a first request to connect to a local area network (LAN), wherein the first request identifies the device and comprises first location information identifying a first portion of the LAN from which the first request is sent;
receive a first response denying the first request based on a first determination that the device is not authorized for use in the first portion of the LAN;
send, through the wireless communication system, a second request to connect to the LAN, wherein the second request identifies the device and comprises second location information identifying a second portion of the LAN from which the second request is sent; and
receive a second response approving the second request based on a second determination that the device is authorized for use in the second portion of the LAN.

17. The device of claim 16, wherein:
a first list of approved devices for the first portion of the LAN does not identify the device; and
a second list of approved devices for the second portion of the LAN identifies the device.

18. The device of claim 17, wherein the first list and the second list are stored on a server connected to the LAN.

19. The device of claim 16, wherein the instructions that are executable by the one or more processors further cause the device to:
capture an image of a barcode;
decode the image of the barcode; and
send decoded data to a server through the LAN.

20. The device of claim 16, wherein the instructions that are executable by the one or more processors further cause the device to indicate a connection error to a user of the device in response to receiving the first response denying the first request.

* * * * *